United States Patent
Hiramatsu et al.

(10) Patent No.: US 11,541,892 B2
(45) Date of Patent: Jan. 3, 2023

(54) VEHICLE CONTROL METHOD AND VEHICLE CONTROL DEVICE

(71) Applicant: Nissan Motor Co., Ltd., Yokohama (JP)

(72) Inventors: Machiko Hiramatsu, Kanagawa (JP); Motonobu Aoki, Kanagawa (JP); Takayuki Kondoh, Kanagawa (JP); Tsuyoshi Sakuma, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/599,407

(22) PCT Filed: Mar. 29, 2019

(86) PCT No.: PCT/IB2019/000409
§ 371 (c)(1),
(2) Date: Sep. 28, 2021

(87) PCT Pub. No.: WO2020/201801
PCT Pub. Date: Oct. 8, 2020

(65) Prior Publication Data
US 2022/0144278 A1    May 12, 2022

(51) Int. Cl.
*B60W 30/18*    (2012.01)
*B60W 50/00*    (2006.01)

(52) U.S. Cl.
CPC ........ *B60W 30/18163* (2013.01); *B60W 30/18054* (2013.01); *B60W 50/0097* (2013.01);
(Continued)

(58) Field of Classification Search
CPC ..... B60W 30/18163; B60W 30/18054; B60W 50/0097; B60W 2520/04;
(Continued)

(56) References Cited

U.S. PATENT DOCUMENTS 7,365,769 B1 *   4/2008   Mager .................... G06V 20/58
                                                            348/148
8,798,841 B1    8/2014   Nickolaou et al.
(Continued)

FOREIGN PATENT DOCUMENTS

EP    2042399 A2    4/2009
EP    3330941 A1    6/2018
(Continued)

OTHER PUBLICATIONS

English Translation_EspaceNet_JP2015149006A (Year: 2015).*

*Primary Examiner* — Peter D Nolan
*Assistant Examiner* — Ashley L Redhead, Jr.
(74) *Attorney, Agent, or Firm* — Young Basile Hanlon & MacFarlane, P.C.

(57) ABSTRACT

A vehicle control method as executed includes acquiring surrounding information of the subject vehicle by a sensor includes, specifying an entry position located on a second lane adjacent to a first lane where the subject vehicle travels in accordance with the surrounding information of the subject vehicle, specifying a front vehicle located front the entry position and a rear vehicle located rear the entry position, determining the travel state of each of the front vehicle and the rear vehicle, determining whether there is a space for the subject vehicle to enter at the entry position, predicting whether the front vehicle starts to travel when the front vehicle and the rear vehicle are determined to be stopped and no space is determined at the entry position, and starting to move the subject vehicle to the entry position when the front vehicle is predicted to start traveling.

16 Claims, 9 Drawing Sheets

(52) U.S. Cl.
CPC ... *B60W 2520/04* (2013.01); *B60W 2530/201* (2020.02); *B60W 2552/10* (2020.02); *B60W 2552/30* (2020.02); *B60W 2552/53* (2020.02); *B60W 2554/406* (2020.02); *B60W 2554/4041* (2020.02); *B60W 2554/4042* (2020.02); *B60W 2554/4045* (2020.02); *B60W 2554/4049* (2020.02); *B60W 2554/802* (2020.02); *B60W 2555/60* (2020.02)

(58) Field of Classification Search
CPC ....... B60W 2530/201; B60W 2552/10; B60W 2552/30; B60W 2552/53; B60W 2554/4041; B60W 2554/4042; B60W 2554/4045; B60W 2554/4049; B60W 2554/406; B60W 2554/802; B60W 2555/60

See application file for complete search history.

(56) References Cited

U.S. PATENT DOCUMENTS

| | | |
|---|---|---|
| 9,884,625 B2 | 2/2018 | Taira et al. |
| 2016/0304097 A1 | 10/2016 | Taira et al. |
| 2018/0201272 A1 | 7/2018 | Takeda |
| 2019/0329777 A1* | 10/2019 | Rajab ................ G08G 1/167 |
| 2020/0079371 A1 | 3/2020 | Sakamoto et al. |
| 2020/0331470 A1 | 10/2020 | Nanri et al. |

FOREIGN PATENT DOCUMENTS

| | | |
|---|---|---|
| JP | 2015149006 A * | 8/2015 |
| JP | 2016-203745 A | 12/2016 |
| JP | 2018-073336 A | 5/2018 |
| WO | 2018/193535 A1 | 10/2018 |
| WO | 2018/220807 A1 | 12/2018 |

* cited by examiner

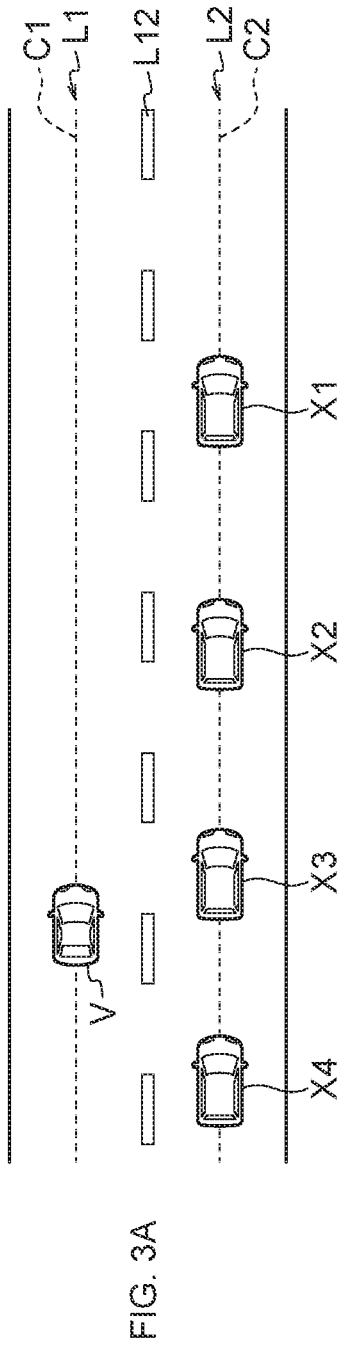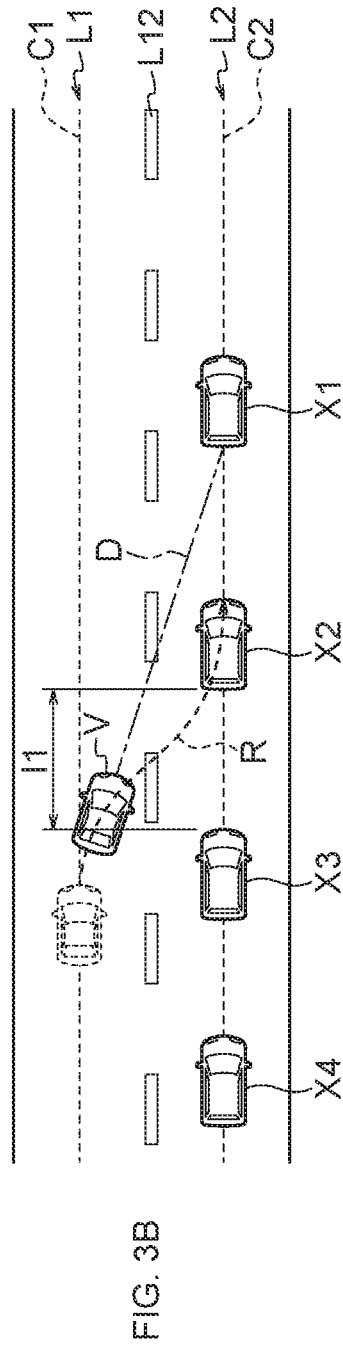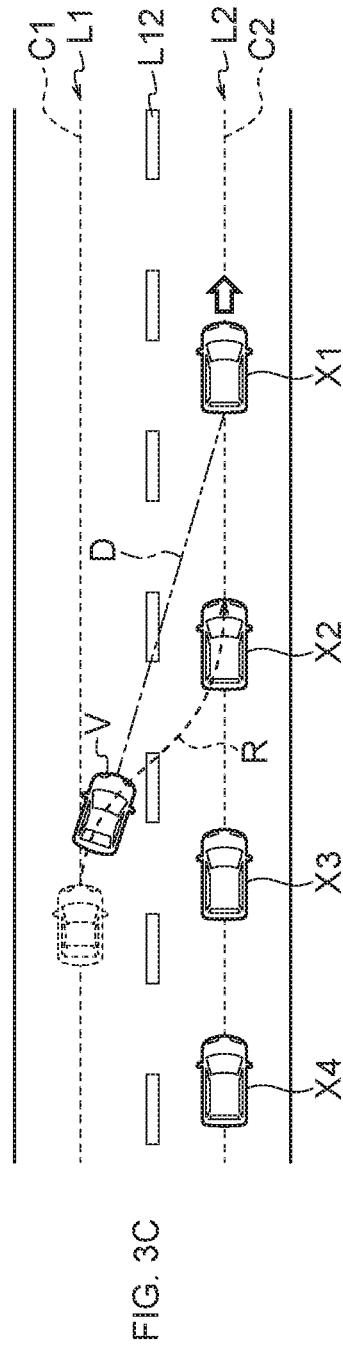

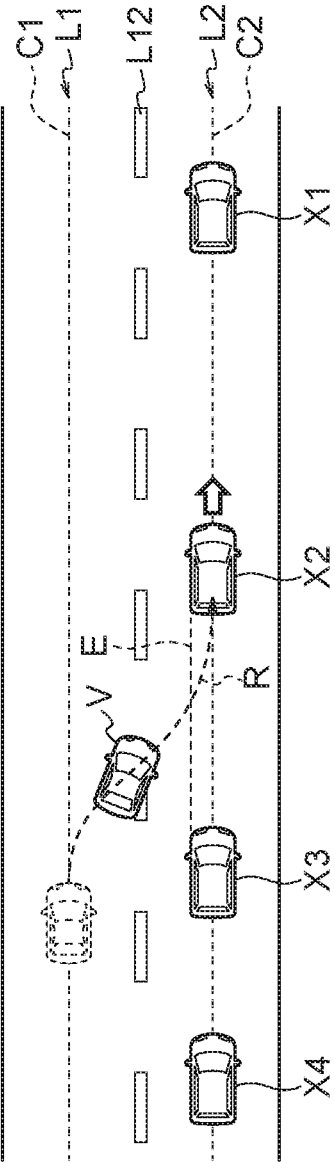
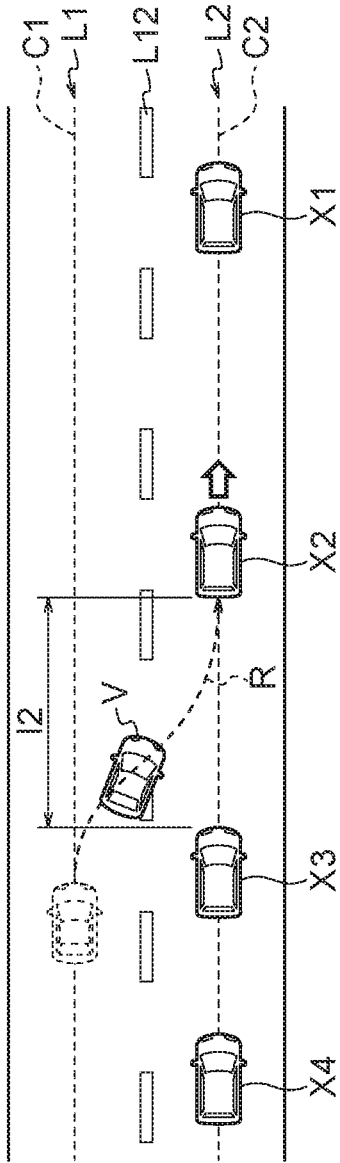
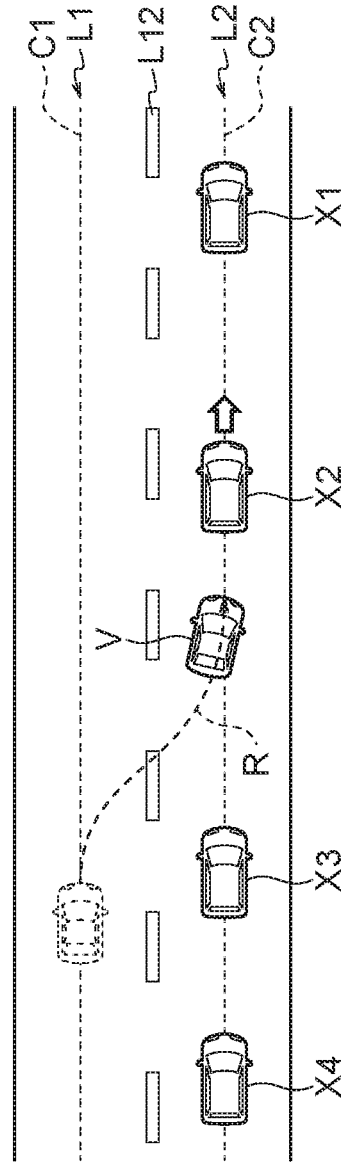

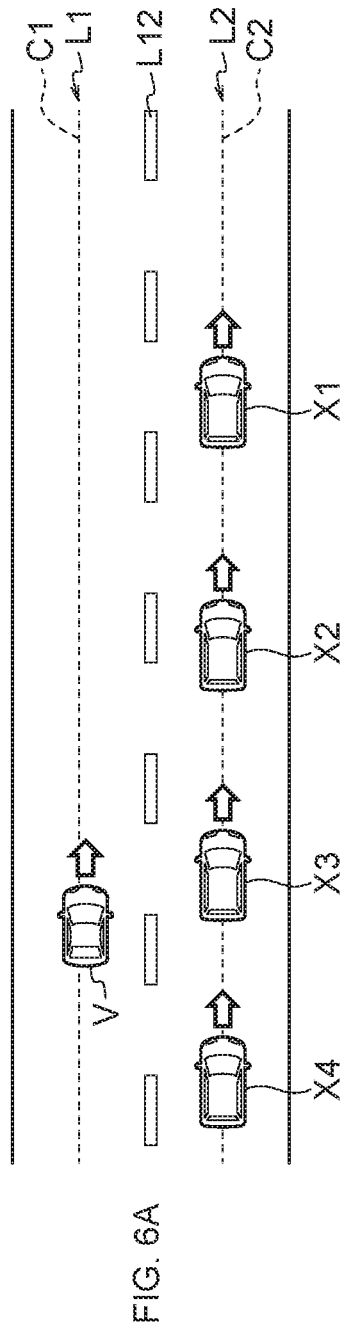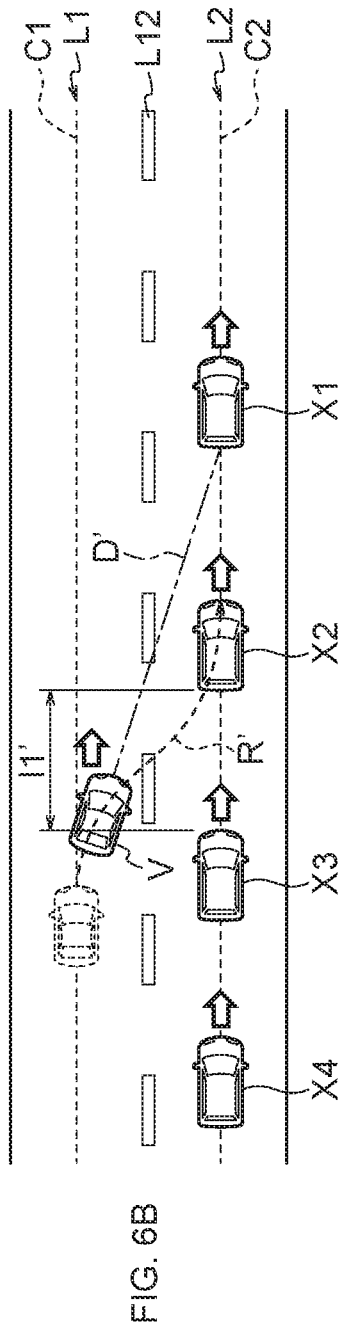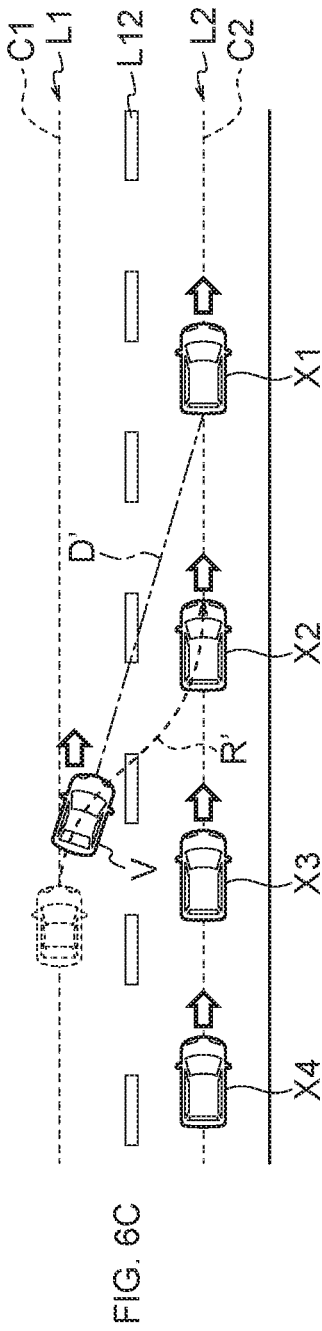

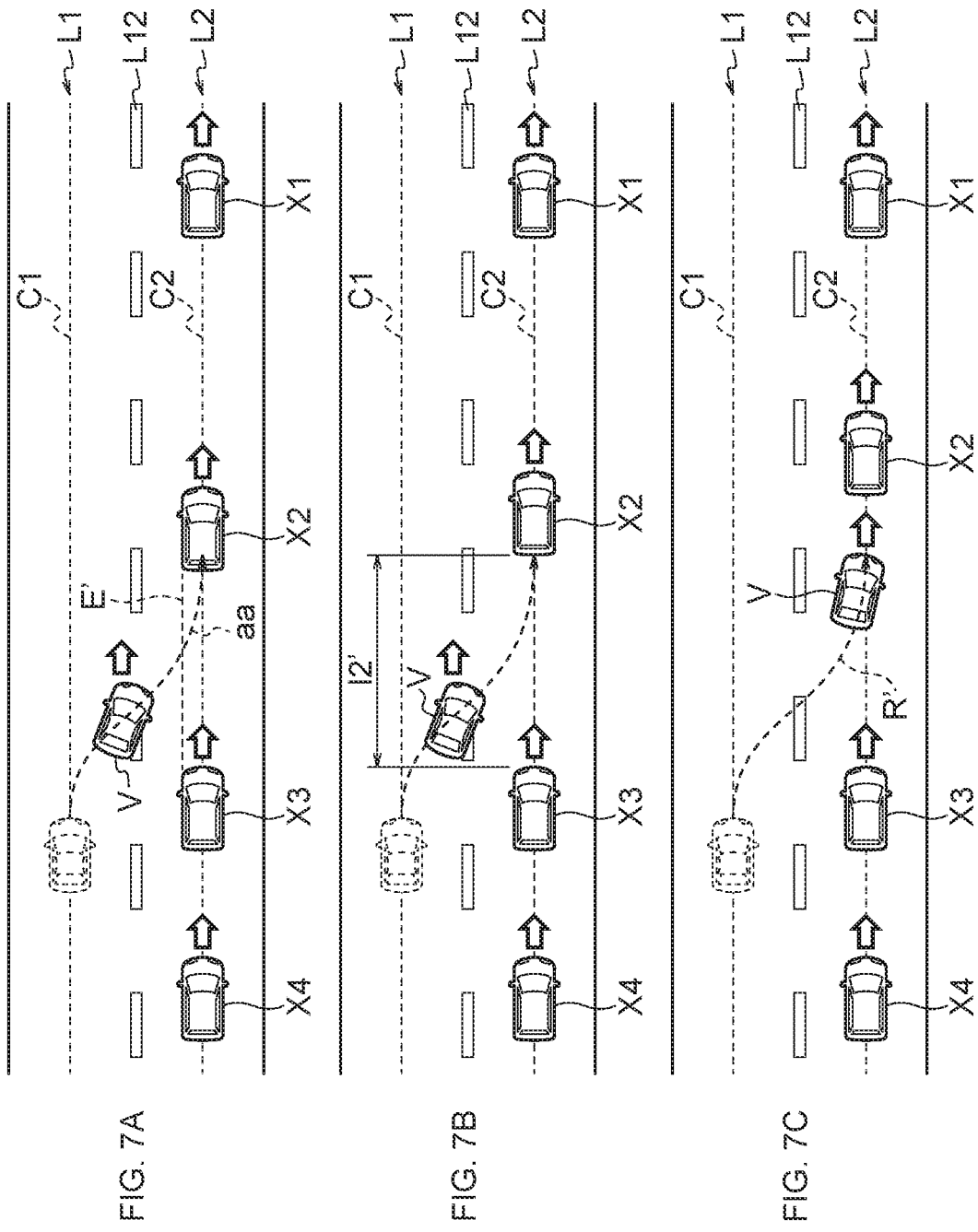

VEHICLE CONTROL METHOD AND VEHICLE CONTROL DEVICE

TECHNICAL FIELD

The present invention relates to a vehicle control method and a vehicle control device.

BACKGROUND

A vehicle traveling control device for lane change to an adjacent lane in a traffic jam adjacent to the traveling lane is known a vehicle traveling in the traveling lane (JP2016-203745A). When the control device determines that there is no space for the vehicle to enter, the control device moves the vehicle along a travel trajectory determined in advance to change the lane, and keeps the vehicle waiting at a standby position on a lane boundary between the travel lane and the adjacent lane, or at a standby position within a predetermined distance from a lane boundary line in the travel lane.

When the control device detect the space while the vehicle is in standby, the control device moves the vehicle from the standby position to the space.

SUMMARY

The vehicle control device starts moving of the vehicle after detecting the space. This may leads to missing the chance of lane change by disappearing of the space immediately after the start of movement.

An object to be solved by the present invention is to provide a vehicle control method and a vehicle control device that reduce missing the chance of lane change.

To solve the above problems, an aspect of the present invention acquires surrounding information of the subject vehicle, specifies an entry position located on a second lane adjacent to a first lane on which the subject vehicle travels in accordance with the surrounding information of the subject vehicle, the entry position indicating a position which the subject vehicle enters, specifies a front vehicle located in front of the entry position and a rear vehicle located behind the entry position among other vehicles, determines the travel state of each of the front vehicle and the rear vehicle, determines whether a space for the subject vehicle to enter is present at the entry position, predicts whether the front vehicle starts to travel when the front vehicle and the rear vehicle are determined to be stopped and no space is determined at the entry position, and starts to move the subject vehicle to the entry position when the front vehicle is predicted to start traveling.

An aspect of the present invention allows to reduce missing the chance of the lane change.

BRIEF DESCRIPTION OF THE DRAWINGS

FIG. 3 is an example of the traveling of the subject vehicle when the process shown in FIG. 2A and FIG. 2B is executed;

FIG. 4 is an example of the traveling of the subject vehicle when the process shown in FIG. 2A and FIG. 2B is executed;

FIG. 6 is an example of the traveling of the subject vehicle when the process shown in FIG. 5A and FIG. 5B is executed; and FIG. 7 is an example of the traveling of the subject vehicle when the process shown in FIG. 5A and FIG. 5B is executed.

DETAILED DESCRIPTION

First Embodiment

Hereinafter, embodiments of the present invention will be described with reference to the drawings. The present embodiment will be described by exemplifying a vehicle control device mounted on a vehicle.

Figure 1:
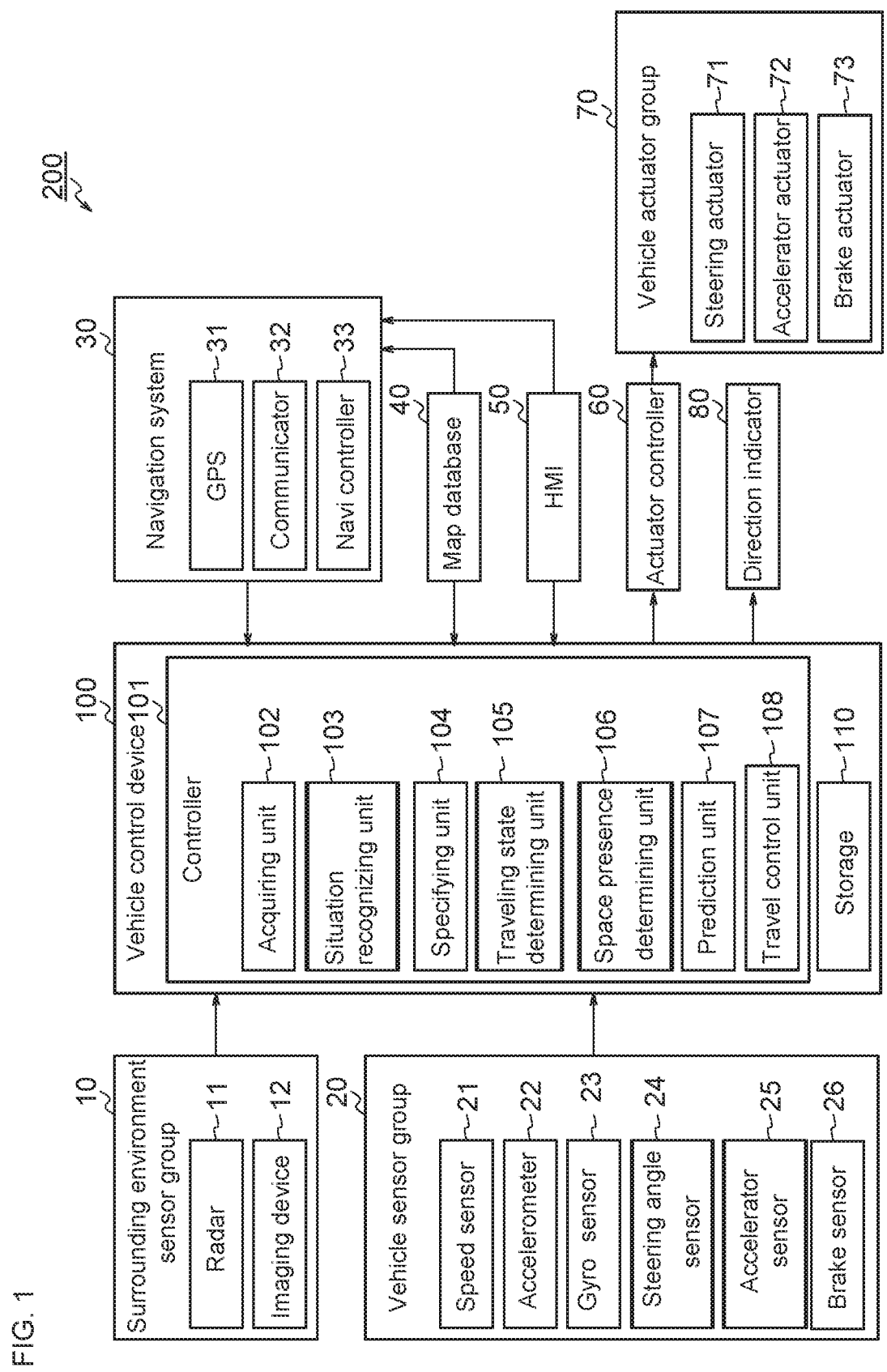
FIG. 1 is a block diagram of an example of a vehicle system including a vehicle control device according to the first embodiment.

FIG. 1 is a block diagram illustrating an example of a vehicle system 200 including a vehicle controller 100 according to an embodiment of the present invention. The vehicle system 200 of the present embodiment is mounted on the vehicle. The vehicle system 200 is a system for the vehicle to automatically change the lane.

As shown in FIG. 1, the vehicle system 200 according to the present embodiment includes a surrounding environment sensor group 10, a vehicle sensor group 20, a navigation system 30, a map database 40, a HMI 50, an actuator controller 60, a vehicle control actuator group 70, a direction indicator 80, and a vehicle controller 100. These device or systems are connected to each other by control area network (CAN) or other in-vehicle LAN for mutually exchanging information.

The surrounding environment sensor group 10 is a sensor group for detecting the state (external state) of the surrounding of the subject vehicle, it is provided in the vehicle. As shown in FIG. 1, the surrounding environment sensor group 10 may include, for example, a radar 11 and an imaging device 12.

The radar 11 detects objects around the subject vehicle. The radar 11 may include, for example, millimeter wave radar, laser radar, ultrasonic radar, and laser rangefinder. The radar 11 detects an object, for example, by transmitting radio waves to the surrounding of the subject vehicle and receiving radio waves reflected by the object. Specifically, the radar 11 detects the direction and the distance to the object. The radar 11 also detects the relative velocity (including the direction of movement) of the object relative to its vehicle based on the direction to the object and the time change of the distance to the object. The radar 11 outputs the detected results to the vehicle controller 100.

In the present embodiment, the radar 11 is intended to detect the omni-directional from the subject vehicle. For example, the radar 11 is provided on the front, side, and rear of the vehicle, respectively, and is composed of a front radar for detecting an object in front of the vehicle, a side radar for detecting an object in the side of the vehicle, and a rear radar for detecting an object in the rear of the vehicle. The number and type of radars 11 included in the subject vehicle are not particularly limited.

The imaging device 12 images the object around the vehicle. The imaging device 12 may include, for example, a camera comprising a CCD or CMOS imaging device. The captured image captured by the imaging device 12 is output to the vehicle controller 100.

In the present embodiment, the imaging device 12 is intended to image the omnidirectional from the subject vehicle. For example, the imaging device 12 is provided in front of the vehicle, side, and rear, respectively, and is composed of a front camera for imaging an object in front of the vehicle, a side camera for imaging an object on the side of the vehicle, the rear camera for detecting an object in the rear of the vehicle. The number and type of the imaging devices 12 included in the subject vehicle are not particularly limited.

The objects detected by the surrounding environment sensor group 10 include, for example, bicycles, motorcycles, vehicles (hereinafter, also referred to as other vehicles), road obstacles, traffic lights, road markings (including lane boundaries), and pedestrian crossings. For example, when another vehicle travels along the traveling direction of the subject vehicle around the subject vehicle, the radar 11 detects the direction and the distance to another vehicle and the relative speed of another vehicle relative to the subject vehicle based on the position of the subject vehicle. Further, the imaging device 12 captures an image capable of determining the vehicle type of another vehicle, the size of another vehicle, and the shape of another vehicle.

Further, for example, when the subject vehicle is traveling in a specific lane among a plurality of lanes, the radar 11 detects a lane boundary line separating the lane in which the subject vehicle is traveling and the lane located on the side of the lane and also detects a distance from the subject vehicle to the lane boundary line. Further, the imaging device 12 captures an image in which the type of the lane boundary line can be specified. When the lane on which the subject vehicle is traveling has lane boundary lines on both sides, the radar 11 detects each of the distance from the subject vehicle to the lane boundary lines. Further, in the following description, the lane on which the subject vehicle is traveling is referred to as the subject lane, and the lane located on the side of the subject lane is referred to as the adjacent lane.

The vehicle sensor group 20 is a sensor group for detecting the state of the subject vehicle (internal state). As shown in FIG. 1, the vehicle sensor group 20 may include a vehicle speed sensor 21, an accelerometer 22, a gyro sensor 23, a steering angle sensor 24, an accelerator sensor 25, and a brake sensor 26.

The vehicle speed sensor 21 measures the rotational speed of the drive system such as a drive shaft, and detects the traveling speed of the subject vehicle based on the measurement result. The vehicle speed sensor 21 is provided, for example, on a drive shaft rotating integrally with the wheels or the wheels of the subject vehicle. The accelerometer 22 detects the acceleration of the subject vehicle. The accelerometer 22 includes a longitudinal accelerometer for detecting the acceleration in the longitudinal direction of the subject vehicle, and a lateral accelerometer for detecting the lateral acceleration of the subject vehicle. The gyro sensor 23 detects the rotating speed of the subject vehicle, that is, the amount of movement (angular velocity) of the angle of the subject vehicle per unit time. The steering angle sensor 24 detects the steering angle of the steering wheel. The steering angle sensor 24 is, for example, provided on the steering shaft of the subject vehicle. The accelerator sensor 25 detects the amount of step-in (the position of the accelerator pedal) of the accelerator pedal. The accelerator sensor 25 is provided, for example, on a shaft of an accelerator pedal. The brake sensor 26 detects the amount of depression of the brake pedal (the position of the brake pedal). The brake sensor 26 is provided, for example, on the shaft of the brake pedal.

The detection result detected by the vehicle sensor group 20 is output to the vehicle controller 100. The detection results may include, for example, vehicle speed, acceleration (including longitudinal and lateral acceleration), angular velocity, amount of depression of the accelerator pedal, and amount of depression of the brake pedal of the subject vehicle.

The navigation system 30 is a system for guiding the occupant (including the driver) of the subject vehicle by indicating a route from the current position of the subject vehicle to the destination based on the information of the current position of the subject vehicle. The navigation system 30 acquires the map information input from the map database 40 to be described later and the information of the destination input via a HMI50 from the occupant of the subject vehicle. The navigation system 30 generates a travel route of the subject vehicle based on the input information. Then, the navigation system 30 outputs the information of the traveling route of the subject vehicle to the vehicle controller 100 and presents the information of the traveling route of the subject vehicle to the occupant of the subject vehicle through HMI50. Thus, the traveling route from the current position to the destination is presented to the occupant.

As shown in FIG. 1, the navigation system 30 includes a GPS31, a communicator 32, and a navigation controller 33.

The GPS31 acquires positional data (Global Positioning System, GPS) that indicates the present position of the subject vehicle. The GPS31 acquires positional data of the subject vehicle by receiving radio waves transmitted from a plurality of satellite communications by a receiver. Further, the GPS31 can detect changes in the positional information of the subject vehicles by receiving radio waves transmitted from a plurality of satellite communications periodically.

The communicator 32 acquires the surrounding state of the vehicle from the outside. The communicator 32 is, for example, a server or a system provided outside the vehicle, or a device capable of communicating with a communicator mounted on another vehicle.

For example, the communicator 32 acquires road traffic information from a road traffic information communication system (Vehicle Information and Communication System, VICS (registered trademark), hereinafter the same) by an information transmission device (beacon) or FM-multiplex broadcasting or the like provided on a road. The road traffic information may include, for example, traffic jam information in lane units, accident information, failure vehicle information, construction information, speed regulation information, lane regulation information, etc. It should be noted that the road traffic information does not necessarily include each of the above-mentioned information, and may include at least any one of the above-mentioned information.

Examples of the traffic jam information may include information of an area where traffic jam occurs, a distance of traffic jam, and a required time until the vehicle passes through the traffic jam. Examples of the accident information may include information of an area where an accident has occurred, the content of the accident, and the time required to leave the area. Examples of the failure vehicle information may include, information of an area where the failure vehicle exists, the number of the failure vehicle, and the time required to exit the area. Examples of the speed regulation information may include information of an area subject to speed regulation and a time zone of speed regulation. Examples of the construction information may include information of the area under construction, a time zone in which the construction is performed, and a time required to leave the area.

Further, for example, the communicator 32 acquires, from the communicator mounted on another vehicle, information on the relative speed of another vehicle with respect to the subject vehicle, information on the relative position of another vehicle with respect to the subject vehicle, and the like. Such communication performed by the subject vehicle and another vehicle is referred to as vehicle-to-vehicle communication. The communicator 32, by vehicle-to-vehicle communication, acquires information such as vehicle speed of another vehicle as surrounding information of the vehicle.

The information such as the relative speed of another vehicle may be acquired by another way. For example, the communicator 32 may acquire information including the position of another vehicle, the vehicle speed, and the traveling direction from VICS as surrounding information of the subject vehicle. The type of information acquired by the communicator 32 is not limited to the above type. For example, the communicator 32 can also acquire weather information of an area where the subject vehicle travels from a server distributing weather information.

The navigation controller 33 is a computer that generates a traveling route from the current position of the subject vehicle to the destination. For example, the navigation controller 33 may include a ROM (Read Only Memory) that stores a program for generating a travel path, a CPU (Central Processing Unit) that executes a program stored in the ROM, and a RAM (Random Access Memory) that functions as an accessible storage device.

The navigation controller 33 acquires information on the present position of the subject vehicle input from the GPS31, road traffic information input from the communicator 32, map information input from the map database 40, and information on the destination of the vehicle input from HMI50. For example, it is assumed that the occupant of the subject vehicle has set the destination of the subject vehicle through the HMI50. The navigation controller 33 generates a route from the current position to the destination in the lane unit as a traveling route of the subject vehicle in accordance with the position information of the subject vehicle, the information of the destination of the subject vehicle, the map information, and the road traffic information. The navigation controller 33 outputs the generated traveling route information to the vehicle controller 100 and presents the information to the occupant of the vehicle via HMI50.

In the present embodiment, the traveling route of the subject vehicle may be any route as long as the vehicle can arrive at the destination from the current position, and other conditions are not limited. For example, the navigation controller 33 may generate the traveling route of the subject vehicle according to the terms set by the occupant. For example, when the occupant chooses to preferentially use a toll road to arrive at a destination, the navigation controller 33 may generate a traveling route using the toll road based on the map information. Further, for example, the navigation controller 33, based on the road traffic information, may generate a traveling route of the subject vehicle. For example, when traffic jam occurs on the way of the shortest route to the destination, the navigation controller 33 may search the detour route and generate a route having the shortest required time out of a plurality of detour routes thus searched as the traveling route.

The map database 40 stores map information. The map information includes road information and traffic rule information. The road information and the traffic rule information are defined by nodes and links (also referred to as road links) connecting the nodes. The links are identified at the lane level.

The road information is relates to roads on which vehicles can travel. Each road link is associated with information relating to roads such as, for example, type of road, road width, road shape, propriety of straight travel, priority relation of travel, propriety of overtaking (entering or not to an adjacent lane), and propriety of lane change although not limited. In addition, information on the installation position of traffic lights, the position of intersections, the entry direction of intersections, the type of intersections, and other intersections, for example, is linked to each road link.

The traffic rule information relates to a traffic rule that the vehicle should observe when traveling. The traffic rules may include pause on a route, park/stop prohibition, slow travel, speed limit, lane change prohibition, for example. The traffic rule information in a section defined by the road link is linked to each road link. For example, lane change prohibition information is linked to a road link in a lane change prohibition section. The traffic rule information may be linked not only to a road link but also to a particular point (latitude, route) on a node or a map, for example.

The traffic rule information may include not only information on traffic rules but also information on traffic lights. For example, information of the color currently displayed by the traffic signal, and/or information of the cycle of the display of the traffic signal may be linked to the road link of the intersection where the traffic signal is installed. The information on the traffic signal is acquired from VICS, for example, by the communicator 32, or from an information transmission device (e.g., optical beacon) provided on the roadway. The display information of traffic signal changes with the passage of time. Thus, the traffic rule information is updated every predetermined cycle.

The map information stored in the map database 40 may be high-precision map information suitable for automatic driving. The high-precision map information is acquired by, for example, communication with a server or a system provided outside the vehicle. Further, high-precision map information, information acquired in real-time using the surrounding environment sensor group 10 (e.g., information of the object detected by the radar 11, the image of the surrounding of the vehicle captured by the imaging device 12) based on, may be generated at any time.

Here, the autonomous driving in the present embodiment will be described. In the present embodiment, the autonomous driving means an driving mode other than the driving mode in which only the driver operates driving. For example, autonomous driving may include a case where a controller (not shown) supports a driver to operate driving or a controller (not shown) operates driving on behalf of the driver In the present embodiment, the vehicle system 200 includes the map database 40, but the map database 40 may be provided outside the vehicle system 200. For example, the map information may be previously stored in a portable storage device (e.g., an external HDD, a flash memory). In this case, the storage device functions as the map database 40 by electrically connecting the vehicle controller 100 and the storage device storing the map information.

The HMI50 is an interface for outputting and inputting data between a passenger of the vehicle and the vehicle system 200 (Human Machine Interface, HMI). Examples of the HMI 50 may include a display for displaying text or video information and a speaker for outputting sound such as music or sound.

The transmission and reception of data via the HMI 50 will be described. For example, when an occupant inputs a destination to the HMI 50, the destination is outputted from the HMI 50 to the navigation system 30. This enables the navigation system 30 to acquire information on the destination of the vehicle. Further, for example, when the navigation system 30 generates a traveling route to the destination, the navigation system 30 outputs the traveling route data to the HMI 50. Then, the HMI 50 outputs the information of the traveling route from the display and/or the speaker. Thus, the information of the traveling route to the destination is presented to the occupant of the subject vehicle. The information on the traveling route to the destination may include, for example, route guidance and required time to the destination.

Further, for example, when the occupant inputs a lane change execution command to the HMI 50, the command is output from the HMI 50 to the vehicle controller 100. This allows the vehicle controller 100 to start the control process of lane change. Further, for example, when the vehicle controller 100 sets the target trajectory for lane change, the information of the target trajectory is outputted from the vehicle controller 100 to the HMI 50. Then, the HMI 50 outputs the information of the target trajectory from the display and/or the speaker. This presents the information of the target trajectory for lane change to the occupant of the subject vehicle. The information of the target trajectory for lane change may include, for example, an entry position specified on an adjacent lane and a target trajectory at the time of lane change. The target trajectory and the entry position will be described later.

The actuator controller 60 controls travel of the subject vehicle. The actuator controller 60 includes a steering control mechanism, an accelerator control mechanism, a brake control mechanism, an engine control mechanism, and the like. The actuator controller 60 acquires a control signal input from the vehicle controller 100 to be described later. The actuator controller 60 enables the autonomous driving of the subject vehicle by controlling the vehicle control actuator group 70 in response to control signal from the vehicle controller 100. For example, the actuator controller 60 calculates a steering angle required for the movement of the vehicle, and an accelerator depression amount or a brake depression amount according to the moving speed in response to a control signal for moving the subject vehicle from the subject lane to the adjacent lane. The actuator controller 60 outputs the calculated various parameters to the vehicle control actuator group 70.

The control of each mechanism may be performed completely automatically, or may be performed in a manner to assist the driving operation of the driver. The control of each mechanism can be interrupted or stopped by an interventional operation of the driver. The travel control method by the actuator controller 60 is not limited to the above-described control method, and other well-known methods can be used.

The vehicle control actuator group 70 is various actuators for driving the subject vehicle. As shown in FIG. 1, the vehicle control actuator group 70 may include a steering actuator 71, an accelerator actuator 72, and a brake control actuator 73.

The steering actuator 71 controls the steering direction and the steering amount of the steering of the subject vehicle in response to a signal input from the actuator controller 60. The accelerator actuator 72 controls the degree of acceleration of the subject vehicle in response to a signal input from the actuator controller 60. The brake control actuator 73 controls the braking operation of the brake device of the subject vehicle in response to a signal input from the actuator controller 60.

The direction indicator 80 has a lamp for blinking inside, when the driver of the vehicle operates the direction instruction switch (not shown), it lights in orange. The direction indicator 80 is a device for indicating the direction of the subject vehicle to proceed to the surroundings when the subject vehicle turns right and left or changes lanes. The direction indicator 80, for example, is integrally provided on the left and right of the front and rear ends of the vehicle. For example, the direction indicator 80 is composed of a left-hand direction indicator and a right-hand direction indicator.

Further, in the present embodiment, the control signal is input from the vehicle controller 100 to the direction indicator 80. The control signal may include, for example, a signal for blinking the direction indicator 80 that is turned off (also referred to as a blink signal) and a signal for turning off the direction indicator 80 blinking (also referred to as a turn-off signal). For example, when a blink signal is input to the direction indicator 80 to blink the left direction indicator, the direction indicator 80 lights the left direction indicator. When the signal to turn off the left direction indicator is input to the direction indicator 80, the direction indicator 80 turns off the left direction indicator. Thus, the direction indicator 80, in addition to the driver of the vehicle, is controlled by the vehicle controller 100.

Next, the vehicle controller 100 will be described. The vehicle controller 100 according to one or more embodiments of the present invention is configured by a computer installed with hardware and software. Specifically, the server 1 is configured to include a read only memory (ROM) that stores programs, a central processing unit (CPU) that executes the programs stored in the ROM, and a random access memory (RAM) that serves as an accessible storage device. As the operation circuits, MPUs (Micro Processing Unit), DSPs (Digital Signal Processor), ASIC (Application Specific Integrated Circuit), and FPGA (Field Programmable Gate Array) can be used instead of or in addition to CPUs. The controller 101 shown in FIG. 1 corresponds to a CPU. The storage 110 shown in FIG. 1 corresponds to a ROM and a RAM.

In the present embodiment, a program to be executed by the controller 101 is stored in advance in the storage 110, but the program may be stored in other device. For example, the program may be stored on a computer readable and portable computer readable recording medium (e.g., disk media, flash memory, etc.). In this case, the controller 101 executes a program downloaded from a computer-readable recording medium. In other words, the vehicle controller 100 may be configured to include only the operating circuit and download the program externally.

As shown in FIG. 1, the controller 101 includes an information acquiring unit 102, a situation recognizing unit 103, a specifying unit 104, a traveling state determining unit 105, a space presence determining unit 106, a prediction unit 107, and a travel control unit 108. These blocks enable the functions described later by the software established in the ROM. In the present embodiment, the functions of the controller 101 are divided into seven functional blocks, and the functions of the respective functional blocks are described. However, the functions of the controller 101 need not necessarily be divided into seven blocks, and may be divided into six or less functional blocks or eight or more functional blocks. The function of the controller 101 is not limited to the function of the function block described below, but may include, for example, a control function of a navigation system.

The function of the information acquiring unit 102 will be described. The information acquiring unit 102 acquires various information from the surrounding environment sensor group 10, the vehicle sensor group 20, the navigation system 30, the map database 40, and each of the HMI50.

The information acquiring unit 102 acquires surrounding information (also referred to as external information of the subject vehicle) of the subject vehicle, which is detected by the surrounding environment sensor group 10. The surrounding information of the subject vehicle includes a detection result detected by the radar 11 and an image captured by the imaging device 12. Further, the information acquiring unit 102 acquires information (also referred to as internal information of the subject vehicle) of the state of the subject vehicle, which is detected by the vehicle sensor group 20. The internal information of the subject vehicle includes the vehicle speed, acceleration, angular velocity, the amount of depression of the accelerator pedal, and the amount of depression of the brake pedal. Further, the information acquiring unit 102 acquires the current position of the subject vehicle, the traveling route of the subject vehicle, and the road traffic information from the navigation system 30. The information acquiring unit 102 acquires map information (including road information and traffic rule information) from the map database 40. The data acquiring unit 102 acquires a lane change command from the HMI50. The various types of information acquired by the information acquiring unit 102 are used in the respective functions described later.

The function of the situation recognizing unit 103 will be described. The situation recognizing unit 103 recognizes the situation around the subject vehicle based on the various information acquired by the information acquiring unit 102 and identifies the lane changing point of the subject vehicle.

The situation recognizing unit 103 recognizes the situation surrounding the subject vehicle. For example, the situation recognizing unit 103 recognizes the presence or absence of an obstacle in the surrounding of the subject vehicle, the direction to the obstacle, the distance to the obstacle, and the relative speed of the obstacle relative to the subject vehicle from the detection result detected by the radar 11 and the captured image captured by the imaging device 12. This enables the situation recognizing unit 103 to grasp the number of obstacles, the positional relationship between each obstacle and the subject vehicle, and the moving speed of the obstacle.

Further, for example, the situation recognizing unit 103 recognizes the distance between the subject vehicle and the lane boundary line from the detection result detected by the radar 11 and from the captured image captured by the imaging device 12. This enables the situation recognizing unit 103 to grasp which position of the subject vehicle is traveling in the subject lane in the lane width direction. In the following, the position of the vehicle in the range of the lane is also referred to as the horizontal position of the vehicle relative to the lane. The situation recognizing unit 103, for example, sets a specific position on the vehicle center line as the horizontal position of the vehicle with respect to the lane although not particularly limited.

Further, for example, the situation recognizing unit 103 specifies the number of lanes of the road where the subject vehicle is traveling in accordance with the detection result by the radar 11, the captured image captured by the imaging device 12, and the map information in the map database 40. When specifying a plurality of lanes along the same direction as the traveling direction of the subject vehicle, the situation recognizing unit 103 specifies a lane in which the subject vehicle is traveling among a plurality of the lanes.

The situation recognizing unit 103 specifies the lane changing point in accordance with the surrounding situation of the subject vehicle and the traveling route of the subject vehicle after recognizing the surrounding situation of the subject vehicle. The situation recognizing unit 103 acquires the current position of the subject vehicle and the traveling route of the subject vehicle from the navigation system 30 and specifies the lane changing point in accordance with the current position of the subject vehicle and the traveling route. The lane changing point indicates a point where the vehicle needs to be moved from the subject lane to the adjacent lane when traveling in the traveling route. The situation recognizing unit 103 specifies a point where to change the lane in the traveling route by referring to the traveling route of the subject vehicle.

The situation recognizing unit 103 specifies a target point in the traveling route such as an intersection, which is a point for switching the traveling direction, or an interchange, which is a point for changing the course in a direction different from the traveling direction of the vehicle. Next, the situation recognizing unit 103, for changing the traveling direction of the subject vehicle at the target point, specifies a lane changing point where needs to move the vehicle to the adjacent lane from the subject lane.

For example, the vehicle that travels in the leftmost lane of a plurality of lanes needs to move to the right lane for turning right at an intersection ahead of the current position according to the traveling route. In such a scene, the situation recognition unit 103 specifies an intersection that requires a right turn as a target point. The situation recognizing unit 103 specifies a point that is a predetermined distance short of the intersection (target point) to be turned right as a lane changing point on the traveling route. For example, the lane changing portion is set at a position several 100 m short of the target point on the traveling route. The lane changing point does not necessarily need to be set at a point, it may be performed in a predetermined section. As another example, the lane changing point may include a predetermined section in front of the branch point provided on the expressway, a predetermined section in front of the merge point provided on the expressway, and a predetermined section in front of the destination of the road vehicle. The branch point provided on the expressway may include the branch points to each direction and the branch points between the main line and the exit. In the present embodiment, the length of the section of the lane changing point is not particularly limited.

In the present embodiment, the subject vehicle automatically changes lane as described below when the lane changing point is specified by the situation recognition unit 103 and the subject vehicle reaches the point, or when an occupant inputs a lane change execution command.

The function of the specifying unit 104 will be described. The specifying unit 104 specifies an entry position that indicates the position of the entry destination of the subject vehicle and is located on a lane adjacent to the subject lane in accordance with the surrounding information of the subject vehicle. For example, the specifying unit 104 specifies the entry position that has a predetermined length (distance) or more from in the direction along the traveling direction of the vehicle on the adjacent lane based on the detection result by the radar 11 and the captured image captured by the imaging device 12. The predetermined distance is a preset distance and is an experimentally determined distance. In the present embodiment, the predetermined distance is set so as to be able to specify the entry position with respect to the adjacent lane in the traffic jam.

Further, the specifying unit 104 specifies, among other vehicles located in front of and behind the entry position, the front one as a front vehicle and the rear one as a rear vehicle when specifying the entry position. That is, the specifying unit 104 specifies a front vehicle, another vehicle located in front of the entry position, and a rear vehicle, being another vehicle located behind the entry position. For example, the specifying unit 104 specifics a front vehicle that is closest to the entry position among a plurality of other vehicles located in front of the entry position in the adjacent lane. Further, the specifying unit 104 specifies a rear vehicle that is closest to the entry position among a plurality of other vehicles located behind the entry position in the adjacent lane. The specifying unit 104 may specify another vehicle in the predetermined area in front of the entry position as the front vehicle. For example, the specifying unit 104 specifies a predetermined area that has a length corresponding to the speed of the subject vehicle in direction along the traveling direction of the subject vehicle. The predetermined area may be stored in a storage such as a ROM although not limited.

The specifying unit 104 specifies a target vehicle located in front of the front vehicle on the adjacent lane after specifying the front vehicle and the rear vehicle. For example, the specifying unit 104 specifies a target vehicle located closest to the front vehicle among other vehicles in front of the front vehicle on the adjacent lane in accordance with the detection result by the radar 11 and the image captured by the imaging device 12.

In the present embodiment, the target vehicle is used for predicting the behavior of the front vehicle. The behavior of the front vehicle means the stopped front vehicle starting. The target vehicle is used to predict the starting of the front vehicle.

The specifying unit 104, when any of the front vehicle, the rear vehicle, and the target vehicle is failed to specified, uses only the information of the identified vehicle for lane change processing. For example, when here is no vehicle in front of the front vehicle although a front vehicle and a rear vehicle were specified, the identification unit 104 uses only the information of the front vehicle and the rear vehicle for lane change processing.

Next, the function of the traveling state determining unit 105 will be described. The traveling state determining unit 105 determines the traveling state of each vehicle specified by the specifying unit 104 in accordance with the surrounding information of the subject vehicle. For example, when the specifying unit 104 specifies the front vehicle, rear vehicle, and the target vehicle, the traveling state determining unit 105 determines the traveling state of the front vehicle, the rear vehicle, and the target vehicle from the detected result by the radar 11 and the captured image captured by the imaging device 12 detected. When the front vehicle is described as an example, the traveling state determining unit 105 determines the traveling state of the front vehicle as being stopped when the speed of the front vehicle is zero km/h, the traveling distance of the front vehicle per unit time is zero km, the brake lamp of the front vehicle is lit, or the traffic signal that arranges the traffic of the adjacent lane indicates red. The traveling state determining unit 105 similarly determines the traveling state for the rear vehicle and the target vehicle.

Next, the function of the space presence determining unit 106 will be described. The space presence determining unit 106 determines whether the entry position specified by the specifying unit 104 in accordance with the surrounding information of the subject vehicle has a space into which the subject vehicle enters (hereinafter, also referred to as an entry space). The entry space is a space between the front vehicle and the rear vehicle and the length of the space along the traveling direction of the vehicle is a predetermined distance or more.

The space presence determining unit 106 determines whether there is any entry space in the entry position in accordance with the vehicle-to-vehicle distance of the front vehicle and the rear vehicle. For example, the space presence determining unit 106, when the vehicle-to-vehicle distance of the front vehicle and the rear vehicle is equal to or greater than a predetermined distance, determines that the entry space is present. On the other hand, the space presence determining unit 106, when the vehicle-to-vehicle distance of the front vehicle and the rear vehicle is less than a predetermined distance, determines no entry space in the entry position. The predetermined distance is configured, in advance, to prevent the driver of the front vehicle and the rear vehicle from any anxiety when the subject vehicle enters the entry space. The predetermined distance may include a value obtained by adding a margin to the distance (vehicle length in the traveling direction) between the front end portion and the rear end portion of the vehicle in a direction along the traveling direction of the subject vehicle.

Next, the function of the prediction unit 107 will be described. The prediction unit 107 predicts whether the front vehicle starts when no entry space is determined in the traveling position by the space presence determining unit 106. The prediction unit 107 predicts whether the front vehicle starts as described below when the front vehicle and the rear vehicle are determined to be stopped by the traveling state determining unit 105.

For example, prediction unit 107 predicts whether the front vehicle starts depending on whether the brake lamp of the front vehicle is off. The prediction unit 107 detects whether the brake lamp of the front vehicle is off based on the captured image captured by the imaging device 12. When the brake lamp is off, the prediction unit 107 predicts that the front vehicle is going to start. On the other hand, when the off of the brake lamp is not detected, the prediction unit 107 predicts that the front vehicle maintains the stop without starting. The prediction unit 107 predicts the starting of the front vehicle in accordance with the operation of the driver of the front vehicle.

Further, the prediction unit 107 predicts whether the front vehicle starts when the target vehicle is specified by the specifying unit 104 in addition to the front vehicle and rear vehicle, in accordance with the behavior of the target vehicle. For example, the prediction unit 107 determines whether the traveling distance of the target vehicle per unit time is equal to or greater than a predetermined distance, then predicts whether the front vehicle starts in response to the determination result.

The prediction unit 107 measures the traveling distance of the target vehicle per unit time in accordance with the detection result detected by the radar 11. When the traveling distance of the target vehicle is measured to be a predetermined distance or more, the prediction unit 107 predicts that the front vehicle is going to start. On the other hand, when the traveling distance of the target vehicle is measured to be less than a predetermined distance, the prediction unit 107 predicts that the front vehicle maintains a stop without starting. The prediction unit 107 predicts the start of the front vehicle in accordance with the distance between the front vehicle and the target vehicle required for the front vehicle to start. The unit time is experimentally determined. The prediction unit 107 can appropriately change the unit time.

Further, the prediction unit 107 predicts whether the front vehicle starts depending on whether the off of the brake lamp of the target vehicle is detected. The prediction unit 107 detects whether the brake lamp of the target vehicle is turned off in accordance with the capture image captured by the imaging device 12. When the brake lamp is off, the prediction unit 107 predicts that the front vehicle is going to start. On the other hand, when the off of the brake lamp is not detected, the prediction unit 107 predicts that the front vehicle maintains the stop without starting. The prediction unit 107 predicts the starting of the front vehicle in accordance with the starting order of the vehicle that the front vehicle starts after the starting of the target vehicle.

The prediction unit 107 may also predict whether the front vehicle starts in response to changes in the situation of the adjacent lane in addition to the behavior of the front vehicle or the target vehicle.

For example, the prediction unit 107 predicts whether the front vehicle starts in accordance with the signal display of the traffic signal that is provided in front of the front vehicle and is arranging the traffic of the adjacent lane. The prediction unit 107, for example, detects whether the signal display of the target signal has been switched from red to blue in accordance with the information from VICS. When the signal display is switched, the prediction unit 107 predicts that the front vehicle is going to start. On the other hand, when the switching of the signal display is not detected, the prediction unit 107 predicts that the front vehicle maintains the stop without starting. The prediction unit 107 predicts the starting of the front vehicle in accordance with the signal display of the signal necessary for the front vehicle to start.

Further, for example, when there is a cause of the traffic jam in front of the front vehicle in the adjacent lane, the prediction unit 107 detects whether the target vehicle or another vehicle ahead of the target vehicle has passed through the point in cause of the traffic jam in accordance with the result detected by the radar 11. When the prediction unit 107 detects that the target vehicle or another vehicle ahead of the target vehicle has passed through the point in cause of the traffic jam, the prediction unit 107 predicts that the front vehicle is going to start. On the other hand, when the prediction unit 107 does not detect the passing of the any vehicle through the point, the prediction unit 107 predicts that the front vehicle maintains the stop without starting. Examples of the cause of the traffic jam may include road construction, accidents, and lane regulation. The prediction unit 107 enables the specifying the cause of the traffic jam in the adjacent lane and the point of the cause in advance in accordance with the road traffic information.

For example, when a pedestrian crossing is in front of the vehicle ahead, the prediction unit 107 detects whether a pedestrian or a bicycle crosses the pedestrian crossing in accordance with the captured image captured by the imaging device 12. When the prediction unit 107 detects the pedestrian or the like to cross the pedestrian crossing, the prediction unit 107 may predict that the front vehicle is going to start. On the other hand, when the prediction unit 107 does not detect the pedestrian or the like to cross the pedestrian crossing, the prediction unit 107 predicts that the front vehicle maintains the stop without starting.

The prediction unit 107 may predict the front vehicle not to start using the following method. The prediction unit 107 determines whether the current situation corresponds to a situation in which the starting of the front vehicle is unpredictable. The prediction unit 107 predicts the front vehicle does not start when the start of the front vehicle is unpredictable. The situations in which the start of the front vehicle is unpredictable may include, for example, the case where the road shape of the adjacent lane is curved and the case where the front vehicle is categorized as the large automobile. For example, when the road shape of the adjacent lane is determined to be a curve based on the map information, or when the front vehicle is detected as a large automobile based on the captured image captured by the imaging device 12, the prediction unit 107 predicts that the front vehicle does not start because predicting the start of the front vehicle is unpredictable.

Next, the functions of the travel control unit 108 will be described. The travel control unit 108 controls the traveling of the subject vehicle in the control processing of the lane change.

The travel control unit 108 sets the standby position of the subject vehicle on the subject lane for predicting whether the front vehicle starts. The standby position is a position for waiting the subject vehicle before lane change of the subject vehicle and a position where the prediction unit 107 executes the prediction processing. For example, the travel control unit 108 sets the standby position on the adjacent lane side with respect to the center line of the subject lane along the traveling direction of the subject vehicle. Further, for example, the travel control unit 108 sets a standby position on the subject lane, which is rear with respect to the front vehicle and is capable of allowing the subject vehicle to move to the entry position smoothly. Further, for example, the travel control unit 108 sets a standby position so that the front end portion of the vehicle is rear than the rear end portion of the front vehicle and the front end portion of the vehicle is in front of the front end portion of the rear vehicle. It should be noted that the standby position is not a position satisfying all of the above-mentioned conditions, and may be a position satisfying at least one of the above-mentioned conditions.

When the standby position of the subject vehicle is set, the travel control unit 108 moves the subject vehicle to the standby position. For example, the travel control unit 108 sets the vehicle speed and the steering angle to the standby position, the vehicle speed at the standby position, an angle at which the front end of the subject vehicle faces in the standby position, and the like, and outputs a control signal including the set contents to the actuator controller 60.

When another vehicle located in an adjacent lane including the front vehicle and the rear vehicle is stopped, the travel control unit 108 sets the vehicle speed at the standby position to zero km/h. This allows the prediction unit 107 to predict whether the front vehicle starts in a state where the subject vehicle is stopped in the standby position.

Further, the travel control unit 108 generates a control signal for turning on the direction indicator 80 provided on the adjacent lane side when the starting of the front vehicle is predicted by the prediction unit 107 and when the rear vehicle is determined to be stopped by the traveling state determining unit 105 at the instant of predicting the start of the front vehicle. Further, the travel control unit 108 generates a target trajectory for the vehicle to change the lane using the current position of the vehicle as a start point and the entry position as an end point. The travel control unit 108 sets the subject vehicle speed and the steering angle when the vehicle travels along the target trajectory. The travel control unit 108 outputs various control signals to the actuator controller 60 and the direction indicator 80. When the position of the subject vehicle reaches the entry position, the travel control unit 108 terminates the blinking of the direction indicator 80 and terminates the lane change control.

Further, the travel control unit 108 controls the subject vehicle so as to wait at a predetermined position before reaching the entry position when the presence determining unit 106 detects no entry space in the entry position. For example, the travel control unit 108 generates an imaginary boundary line by connecting the nearest position of the front end of the rear vehicle to the subject lane and the nearest position of the rear end of the front vehicle to the subject lane, in the target trajectory. The travel control unit 108 specifies a position where the subject vehicle does not exceed the imaginary boundary line on the target trajectory. The travel control unit 108 controls the subject vehicle so as to wait for the subject vehicle at the specified position. This allows the driver of the rear vehicle to be informed that the subject vehicle is waiting in front of the rear vehicle for lane change to the adjacent lane.

Further, the travel control unit 108, when the target vehicle is specified, sets the moving distance of the subject vehicle along the target trajectory in accordance with the traveling distance of the target vehicle. For example, the travel control unit 108 detects the travel distance of the target vehicle per unit time in accordance with the detection result detected by the radar 11. The travel control unit 108 sets the moving distance of the subject vehicle longer as the traveling distance of the target vehicle per unit time is longer. The travel control unit 108, by referring to the detection result by the vehicle sensor group 20, controls the subject vehicle to moves in the set movement distance.

Further, the travel control unit 108 sets the subject vehicle speed and the steering angle for travelling along the target trajectory when the presence determining unit 106 detects an entry space at the entry position. The travel control unit 108 outputs various control signals to the actuator controller 60. This allows the subject vehicle to change lanes from the subject lane to the adjacent lane along the target trajectory and so enter the space between the front vehicle and the rear vehicle. The subject vehicle is allowed to move to the entry position anytime the process can be executed. The travel control unit 108 enables the subject vehicle to move to the entry position when the entry space is detected in the entry position.

Figure 2A:
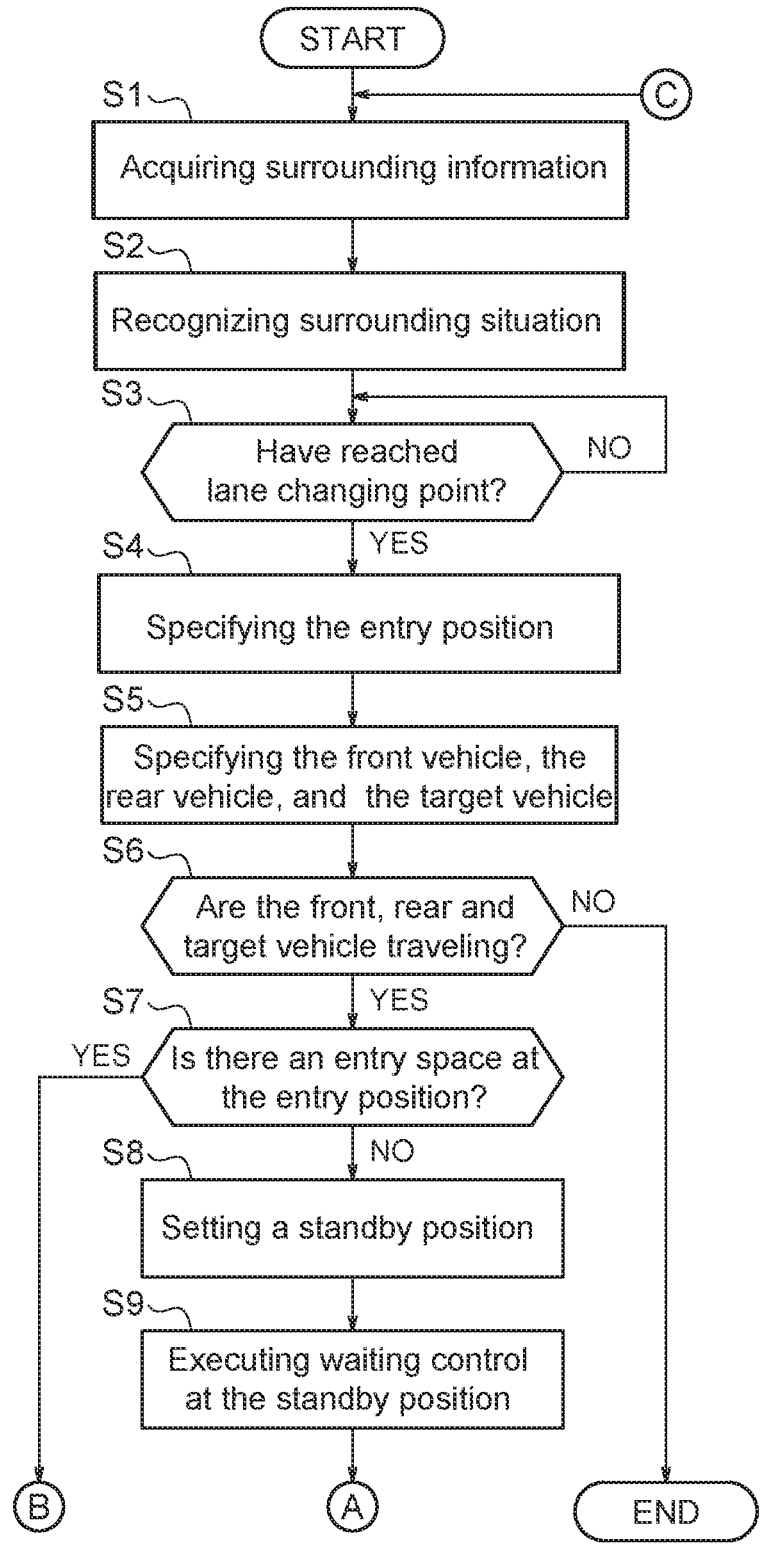
FIG. 2A is a flowchart of a control process executed by the vehicle control device according to the first embodiment of the present invention.
Figure 2B:
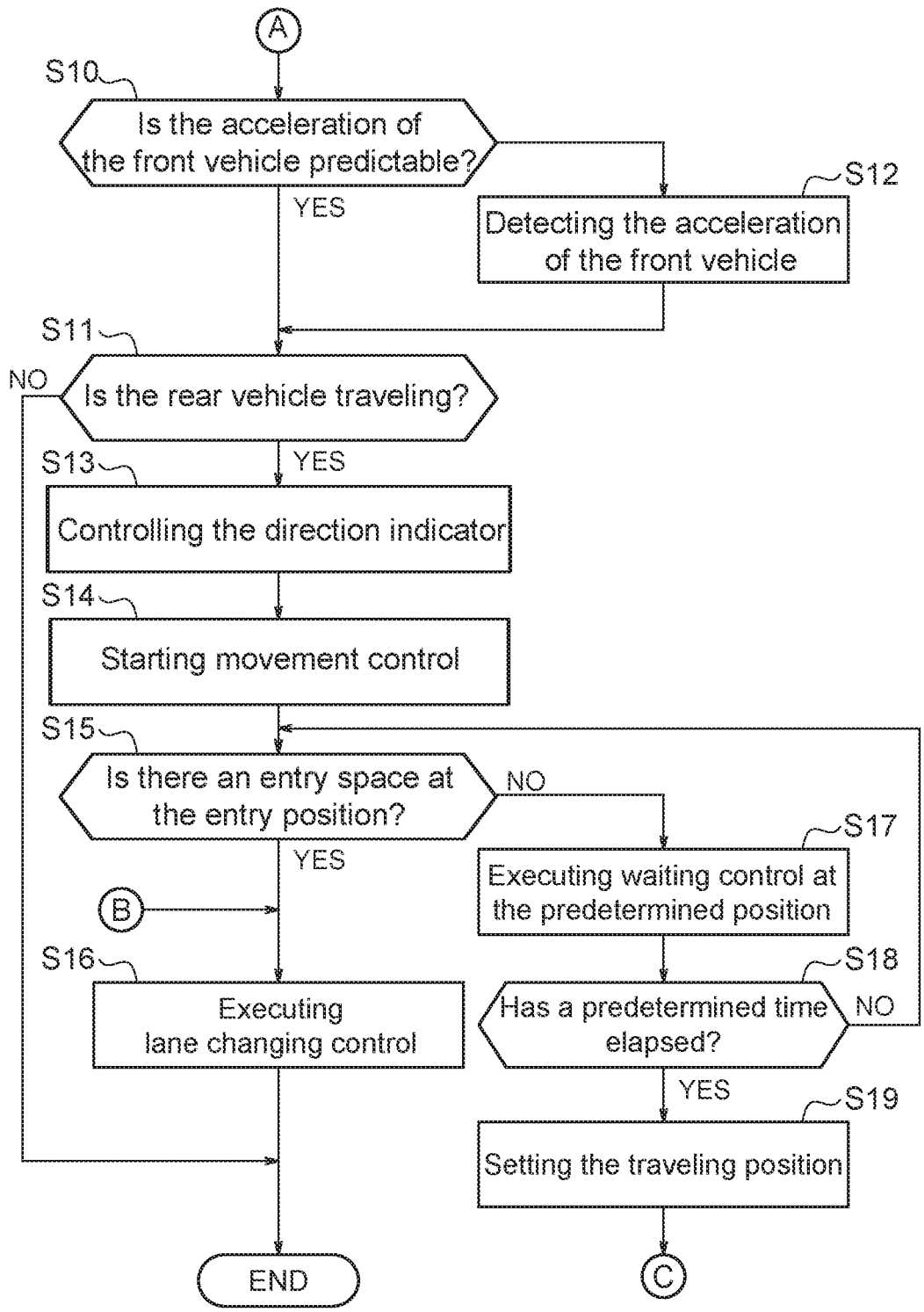
FIG. 2B is a flowchart of a control process executed by a vehicle control device according to the first embodiment.

Next, a control flow of the controller 101 according to the present embodiment will be described with reference to FIG. 2A and FIG. 2B. FIG. 2A and FIG. 2B are flowcharts illustrating the control processes executed by the controller 101. Further, with reference to FIGS. 3 and 4, an example of the traveling of the subject vehicle performed by the controller 101 will be described. The control of each may be performed completely automatically, or may be performed in a manner to assist the driving operation of the driver.

In step S1, the controller 101 acquires surrounding information of the subject vehicle. For example, the controller 101 acquires information from the surrounding environment sensor group 10 about the direction to another vehicle and the distance to another vehicle, the relative speed of another vehicle to the subject vehicle, the vehicle type of another vehicle, the size of another vehicle, and the shape of another vehicle as the surrounding information of the subject vehicle. Further, for example, the controller 101 acquires the traffic jam information of the road including the subject lane as the surrounding information of the subject vehicle from the communicator 32. The controller 101 acquires the external information and the internal information of the subject vehicle at a predetermined cycle while executing the control processing after step S2. The traveling state is expressed by, for example, the position of the vehicle and the vehicle speed.

In step S2, the controller 101 recognizes the situation around the subject vehicle in accordance with the surrounding information of the subject vehicle acquired in step S1.

In step S3, the controller 101 specifies a section (lane changing point) for the subject vehicle to change the lane. Further, the controller 101 compares the current position of the subject vehicle with the lane changing point and determines whether the subject vehicle reaches the lane changing point. When the controller 101 determines that the vehicle has reached the lane change point, the process proceeds to step S4. On the other hand, when it is determined that the subject vehicle has not reached the lane changing point, the system stands by in Step S3.

In step S4, the controller 101 specifies an entry position that indicates the position for the subject vehicle to enter and is located on an adjacent lane in accordance with the surrounding information of the subject vehicle. For example, the specifying unit 104 specifies the entry position where the distance in the direction along the traveling direction of the vehicle is a predetermined distance or more on the adjacent lane.

In step S5, the controller 101 specifies a front vehicle, being another vehicle that is located in front of the entry position, and specifies a rear vehicle, being another vehicle that is located in the rear of the entry position in accordance with the surrounding information of the subject vehicle. Further, the controller 101 specifies a target vehicle, being another vehicle located in front with respect to the front vehicle. Incidentally, when any of the front vehicle, the rear vehicle, and the target vehicle is failed to specified, the controller 101 uses only the information of the specified vehicle for lane change processing when the controller 101 fails to specify in the subsequent steps.

In step S6, the controller 101 determines the traveling state of the front vehicle, the rear vehicle, and the target vehicle. Specifically, the controller 101 determines whether all of these vehicles are stopped. For example, the controller 101 determines the traveling state of each vehicle from the detection result by the surrounding environment sensor group 10. When the controller 101 determines that all the vehicles are stopped, the process proceeds to step S7. On the other hand, when the controller 101 determines that at least one of the vehicles is traveling, the controller 101 terminates the vehicle change process.

When all the vehicles are determined to be stopped in step S6, the process proceeds to step S7. In the subsequent steps S7 to S19, the controller 101 executes a lane change process when the front vehicle, the rear vehicle, and the target vehicle are stopped.

FIG. 3 (A) is an example of a scene in which the subject vehicle V changes lanes from the lane $L_1$ to the lane $L_2$ on a road with two lanes on one side (lane $L_1$, lane $L_2$). The lane $L_2$ is a lane adjacent to the lane $L_1$ to the right of the vehicle V. A lane border $L_{12}$ is provided between the lane $L_1$ and the lane $L_2$. The vehicle traveling in the lane $L_1$ is the subject vehicle V. Stopped vehicles on the lane $L_2$ are other vehicle $X_1$ to other vehicle $X_4$. The scene in FIG. 3A is an exemplary scene after the processes of steps S1 to S6 in the FIG. 2A. The center line $C_1$ indicates the center line of the lane $L_1$ along the traveling direction of the subject vehicle V, and the center line $C_z$ indicates the center line of the lane $L_2$ along the traveling direction of the subject vehicle V.

In the scene in FIG. 3A, the controller 101 determines that the subject vehicle V has reached the lane change point (not shown) (determined YES in step S3), and specifies the entry position between another vehicle $X_2$ and another vehicle $X_3$ (step S4). Further, the controller 101 specifies the front vehicle, being the vehicle $X_2$ positioned in front of the entry position, specifies the rear vehicle, being the vehicle $X_3$ positioned behind the entry position, and specifies the target vehicle, being the vehicle $X_1$ positioned in front of the vehicle $X_2$ (step S5). The controller 101 determines that the vehicle $X_1$ to the vehicle $X_3$ are stopped in accordance with the surrounding information of the subject vehicle (YES is determined in step S6). Incidentally, the parentheses indicate the corresponding processes in the flowchart shown in the FIG. 2A.

Returning to the FIG. 2A, a flowchart of the lane change process will be described. In step S7, the controller 101 determines whether an entry space is present at the entry position set in step S4. The controller 101, in accordance with whether the length of the space between the front vehicle and the rear vehicle is on a predetermined distance, determines whether the entry space is present. For example, the controller 101, when the vehicle-to-vehicle distance of the front vehicle and the rear vehicle is equal to or greater than a predetermined distance, determines that an entry space is present in the entry position. On the other hand, the controller 101, when the vehicle-to-vehicle distance of the front vehicle and the rear vehicle is less than a predetermined distance, determines that there is no entry space in the entry position. When the entry space is determined to be present in the entry position, the process proceeds to Step S16, and the controller 101 executes the lane change control to move from the subject lane to the adjacent lane and terminates the vehicle change process. On the other hand, when no space is determined at the entry position, the process proceeds to step S8.

In step S7, when no space is determined in the entry position, the process proceeds to step S8. In step S8, the controller 101 sets a standby position. For example, the controller 101 sets the standby position on the adjacent lane side with respect to the center line of the subject lane along the traveling direction of the subject vehicle. In FIG. 3A, the standby position is set to the lane $L_2$ with respect to the center line $C_1$ of the lane $L_1$.

In step S9, the controller 101 executes a waiting control for waiting the subject vehicle at the standby position set in step S8. For example, the controller 101 sets the vehicle speed and steering angle to the standby position, the vehicle speed at the standby position (zero km/h), the angle at which the front end of the subject vehicle faces in the standby position, and the like. Then, the controller 101 outputs a control signal including the contents set to the actuator controller 60.

FIG. 3B is a scene in which a predetermined period of time has elapsed from the scene in FIG. 3A, and is an exemplary scene after the processes of steps S7 to S9 in FIG. 2A.

In the scene shown in FIG. 3B, the controller 101 determines no space in the entry position since the distance between the vehicle $X_2$ and the vehicle $X_3$ (11) is less than a predetermined distance (determined No in step S7). Further, the controller 101 sets the standby position of the subject vehicle V on the subject lane (step S8), and stops the subject vehicle V at the standby position (step S9). The controller 101 predicts whether the front vehicle (the vehicle $X_2$) starts while the vehicle V is stopped at the standby position. The parentheses indicate the corresponding processes in the flowchart shown in the FIG. 2A.

The target trajectory R shown in FIG. 3B represents a trajectory of the subject vehicle V scheduled to travel. The target trajectory R (dashed line) is shown for easy visually understanding that there is no entry space between the vehicle $X_2$ and the vehicle $X_3$. Thus, the target trajectory R may not be generated in the scene shown in FIG. 3B. The dashed line D connecting the subject vehicle V and the vehicle $X_1$ indicates that the vehicle $X_1$ can be detected by the radar 11 mounted on the subject vehicle V. That is, the target vehicle (the vehicle $X_1$) is stopped within the detection range of the radar 11.

Returning to the FIG. 2B, the flowchart of the lane change process will be described. In step S10, the controller 101 determines whether the starting of the front vehicle can be predicted. For example, the controller 101 predicts whether the front vehicle starts in accordance with the brake lamp of the target vehicle. When the start of the front vehicle can be predicted, the process proceeds to step S11. On the other hand, when the start of the front vehicle is unpredictable, or when the current situation corresponds to a situation in which the start of the front vehicle is unpredictable, the process proceeds to step S12.

In step S10, when the start of the front vehicle is unpredictable, or when the current situation corresponds to a situation in which the start of the front vehicle is unpredictable, the process proceeds to step S12. In step S12, the controller 101 detects the start of the front vehicle in accordance with the surrounding information of the subject vehicle. For example, the controller 101 detects the start of the front vehicle when the position of the front vehicle moves in the traveling direction of the vehicle. The subject vehicle waits at this step until the start of the vehicle ahead can be detected.

In step S10, when the start of the front vehicle is predicted, the process proceeds to step S11. In step S11, the controller 101 determines whether the rear vehicle is stopped. This step for is determining stop of the rear vehicle that is determined to be stopped in step S6 again. When the rear vehicle is determined to be stopped, the process proceeds to step S13. On the other hand, when the rear vehicle is determined that the rear to be traveling, the controller 101 terminates the vehicle change process.

When the rear vehicle is determined to be stopped in step S11, the process proceeds to step S13. In step S13, the controller 101 turns on a direction indicator provided on the adjacent lane side. This allows the driver of the rear vehicle to communicate to the driver of the rear vehicle that the vehicle will change lane before releasing the brake pedal. As a result, the driver of the rear vehicle continues to depress the brake pedal even after the front vehicle is started, thereby enhancing the possibility that the subject vehicle enters the front of the rear vehicle.

FIG. 3C illustrates a scene in which a predetermined period of time has elapsed from the scene illustrated in FIG. 3B, and is an exemplary scene after the processes of steps S10 to S13 illustrated in 2B have been executed.

In the scene shown in FIG. 3C, the controller 101 predicts the start of the vehicle $X_2$ by detecting the start of the vehicle $X_1$ (e.g., detects the off of the braking lamp of the vehicle $X_1$) (determined YES in step S10). Further, the controller 101 determines the vehicle $X_3$ (rear vehicle) to be stopped (YES in step S11). In step S13, the controller 101 turns on the directional indicator provided on the lane $L_2$. The parentheses indicate the corresponding processes in the flowchart shown in the FIG. 2B.

Returning to the FIG. 2B, a flowchart of the lane change process will be described. In step S14, the controller 101 starts execution of the movement control for moving the vehicle toward the entry position. For example, the controller 101 generates a target trajectory for changing the lane and sets the subject vehicle speed and the steering angle for traveling of the vehicle along the target trajectory. Then, the controller 101 starts to move the subject vehicle toward the entry position.

In step S15, the controller 101 determines whether an entry space is present in the entry position. This step corresponds to step S7. Thus, the description of the determination method and the like is referred to above. When the space is determined to be present in the entry position, the process proceeds to Step S16, and the controller 101 executes the lane change control to move the subject vehicle from the subject lane to the adjacent lane and terminates the vehicle change process. On the other hand, when no space is determined at the entry position, the process proceeds to step S17.

When no space is determined at the entry position in step S15, the process proceeds to step S17. In step S17, the controller 101 causes the subject vehicle to wait at a predetermined position. For example, the controller 101 generates an imaginary boundary line by connecting the nearest position of the front end of the rear vehicle to the subject lane and the nearest position of the rear end of the front vehicle to the subject lane. Then, the controller 101 specifies a position where the subject vehicle does not exceed the imaginary boundary line on the target trajectory and waits for the subject vehicle at the specified position.

FIG. 4A illustrates a scene in which a predetermined period of time has elapsed from the scene illustrated in FIG. 3C, and is an exemplary scene after the treatments of step S14, step S15, and step S17 illustrated in the FIG. 2B have been executed.

In the scene of FIG. 4A, the controller 101 generates a trajectory in which the vehicle V is scheduled to travel when changing the lane as the target trajectory R, and moves the vehicle V toward the entry position (step S14). Further, the controller 101 determines no entry space in the entry position (No determination in step S15) and waits the subject vehicle V at a predetermined position (step S17). The parentheses indicate the corresponding processes in the flowchart shown in the FIG. 2B. In the process of step S14 or step S17, it is assumed that the controller 101 does not move the vehicle V closer to the lane $L_2$ than the dotted line E. The dotted line E shown in FIG. 4A is an imaginary border line connecting the corner located on the lane L1 side of the rear end portion of the vehicle $X_2$ and the corner located on the lane L1 side of the rear end portion of the vehicle $X_3$.

FIG. 4B illustrates a scene in which a predetermined period of time has elapsed from the scene illustrated in FIG. 4A, and is an exemplary scene after the process of S15 illustrated in FIG. 2B has been executed. In the scene of FIG. 4B, the controller 101 determines that the entry space is present at the entry position (determined as YES in step S15). The parentheses indicate the corresponding processes in the flowchart shown in the FIG. 2B.

FIG. 4C illustrates a scene in which a predetermined period of time has elapsed from the scene illustrated in FIG. 4B, and is an exemplary scene after the process of S16 illustrated in FIG. 2B has been executed. In the scene of FIG. 4C, the controller 101 moves the subject vehicle V along the target trajectory R to cause the subject vehicle V to enter a position between the vehicle $X_2$ and the vehicle $X_3$ (S16). The subject vehicle V changes the lane from the lane $L_1$ to the lane $L_2$ in traffic jam. The parentheses indicate the corresponding processes in the flowchart shown in the FIG. 2B.

Returning to the FIG. 2B, a flowchart of the lane change process will be described. In step S18, the controller 101 determines whether a predetermined time has elapsed. When the predetermined time is determined to have elapsed, the process proceeds to step S19. When the predetermined time is determined not to have elapsed, the process returns to step S15. The predetermined time is an experimentally determined time, and is not a particularly limited time. The controller 101 can appropriately change the predetermined time.

When the predetermined time is determined to have elapsed in step S18, the process proceeds to step S19. In step S19, the controller 101 sets the traveling position of the subject vehicle. For example, the controller 101 sets the traveling position of the subject vehicle at a predetermined position near the center of the subject lane and moves the subject vehicle from the standby position set in Step S17 to the surrounding of the center of the subject lane. When the process in step S19 ends, the process returns to step S1, and the processing in step S1 and subsequent steps is executed again. This allows the lane change processing again even when no space is determined in the entry position in step S15 and the subject vehicle fails to change the lane.

As described above, in the vehicle control method executed by the vehicle controller 100 according to the present embodiment, the controller 101 acquires the surrounding information of the subject vehicle by the environment sensor group 10 acquires and specifies an entry position that indicates the position of the entry destination of the subject vehicle and is located on an adjacent lane adjacent to the subject lane in accordance with the acquired surrounding information of the subject vehicle. Further, the controller 101 specifies the front vehicle, being another vehicle located in front of the entry position, and specifies the rear vehicle, being another vehicle located behind the entry position, among other vehicles located in front of and behind the entry position. The controller 101 determines the state of travelling of the front vehicle and the rear vehicle and determines whether the entry space is present at the entry position. Then, when the front vehicle and the rear vehicle is determined to be stopped and no entry space is determined in the entry position, the controller 101 predicts whether the front vehicle stops. When the start of the front vehicle is predicted, the controller 101 starts the movement of the subject vehicle toward the entry position. This allows the subject vehicle to start to move to the entry position before the rear vehicle starts, i.e., while the rear vehicle is stopped. When the front vehicle actually starts, the vehicle is moving toward the entry position or waiting at a predetermined position. This increases the possibility that the driver of the rear vehicle stops the rear vehicle to urge the entry of the vehicle. As a result, for example, even in a situation where it is difficult to enter the adjacent lane due to traffic jam, the subject vehicle enables the lane change at an appropriate timing and missing the chance of the lane change can be reduced.

In addition, in the present embodiment, another vehicle positioned ahead of the front vehicle is specified as the target vehicle, and it is determined whether the travel distance of the target vehicle per unit time is equal to or greater than a predetermined distance. When the travel distance of the target vehicle per unit time is determined to be equal to or greater than a predetermined distance, the front vehicle is predicted to start. This allows to properly predict the start of the front vehicle before the front vehicle actually starts.

Furthermore, in the present embodiment, when the brake lamp of the target vehicle is detected to be off, the controller 101 predicts that the front vehicle starts. This allows to properly predict the start of the front vehicle before the front vehicle actually starts.

In the present embodiment, when the brake lamp of the front vehicle is detected to be off, the controller 101 predicts that the front vehicle starts. Detecting the behavior of the front vehicle before starting allows to predict the start of the front vehicle with good accuracy.

In the present embodiment, the prediction unit 107 acquires information on traffic lights determining the traffic flow of adjacent lanes. The prediction unit 107 predicts that the front vehicle will start when the display of the traffic signal changes from red to blue. This allows to predict the start of the front vehicle faster than predicting the start of the front vehicle in accordance with the behavior of the target vehicle.

In the present embodiment, when no entry space is determined to be present at the entry position, the controller 101 sets the standby position of the subject vehicle on the subject lane and predicts whether the front vehicle starts while the subject vehicle is waiting at the standby position. This allows the subject vehicle to start moving smoothly toward the entry position. The standby position satisfies at least one of requirements below. (i) The standby position is a predetermined position on the adjacent lane side with respect to the center line of the subject lane along the traveling direction of the subject vehicle. (ii) The standby position is a predetermined position rear of the rear end of the front vehicle. (iii) The front end of the subject vehicle located on the standby position is rear of the end of the front vehicle and the front end of the subject vehicle located on the standby position is front of the front end of the rear vehicle.

In the present embodiment, no entry space is determined to be present at the entry position, the controller 101 sets the standby position of the subject vehicle on the subject lane to and predicts whether the front vehicle starts while the subject vehicle is waiting at the standby position. The standby position is a position where the surrounding environment sensor group 10 is capable of detecting the state of the target vehicle. This allows to appropriately detect the behavior of the target vehicle.

In the present embodiment, when the front vehicle is predicted to start, the controller 101 moves the subject vehicle to a predetermined position. This allows, if the subject vehicle starts to move toward the entry position, to prevent the driver of the rear vehicle from feeling any anxiety and to accurately tell the driver of the rear vehicle that the subject vehicle is scheduled to change lanes to the adjacent lane. The predetermined position satisfies the requirement following. The side end of the subject vehicle located on the predetermined position is in the subject lane side respect to the a imaginary boundary line formed by the connecting the nearest position of the front end of the rear vehicle to the subject lane and the nearest position of the rear end of the front vehicle to the subject lane.

In the present embodiment, when the traveling distance of the target vehicle per unit time is less than a predetermined distance, the prediction unit 107 predicts the front vehicle not to start. When the starting of the front vehicle is not predicted, the travel control unit 108 waits the subject vehicle. When the travel distance of the object vehicle is short, the subject vehicle is unlikely to change lanes since the space between the front vehicle and the rear vehicle is not widened. The present embodiment allows to prevent the subject vehicle from moving toward entry position in situations where lane change is unlikely.

In the present embodiment, when the traveling distance of the target vehicle per unit time is equal to or greater than a predetermined distance, the prediction unit 107 predicts the front vehicle to start in accordance with the traveling distance of the target vehicle, and the travel control unit 108 sets the moving distance toward the entry position of the vehicle. This allows, if the subject vehicle starts moving, to prevent the subject vehicle from entering the front vehicle unnecessarily since the front vehicle travels a distance corresponding to the traveling distance of the target vehicle.

In the present embodiment, when the present situation corresponds to a situation in which the start of the front vehicle is unpredictable, the controller 101 moves the subject vehicle toward the entry position after detecting the start of the front vehicle. This allows to prevent the subject vehicle from moving before the start of the front vehicle when the start of the front vehicle is difficult to predict such as large-sized automobiles.

In the present embodiment, a situation in which the departure of the front vehicle is unpredictable satisfies at least one of following requirements. The road shape of the adjacent lane is curved. The front vehicle is a large-sized automobile. Thus, for example, in a situation where the start of the front vehicle is hardly to be detected like a large-sized automobile, the vehicle controller 100 allows to prevent the subject vehicle from moving before the starting of the front vehicle.

In the present embodiment, the controller 101 turns on the direction indicator on the adjacent lane side when the start of the front vehicle is predicted. This allows to accurately tell the driver of the another vehicle located around the vehicle that the vehicle is scheduled to lane change from this to the adjacent lane side before the rear vehicle starts.

Second Embodiment

Next, a vehicle control device and a vehicle control method according to another embodiment of the present invention will be described. In the present embodiment, a part of the functions of the traveling state determining unit 105, the prediction unit 107, and the travel control unit 108 are different with respect to the first embodiment described above. Other configurations and control processes are the same as those of the first embodiment, and thus the above description will be referred to. In the following description, it is assumed that the front vehicle, the rear vehicle, and the target vehicle are specified, but as described in the first embodiment, when any vehicle cannot be specified, the vehicle controller 100 uses only the information of the specified vehicle for the lane change processing.

The traveling state determining unit 105 of the present embodiment determines whether the front vehicle, the rear vehicle, and the target vehicle are traveling. For example, when the speed of the front vehicle is less than a predetermined speed, when the traveling distance of the front vehicle per unit time is less than a predetermined distance, and when the brake lamps of the front vehicle are repeatedly turned on or off at predetermined intervals, the traveling state determining unit 105 determines the traveling state of the front vehicle as slow travel. The predetermined speed, the unit time, the predetermined distance, and the predetermined interval are experimentally determined values, and are not particularly limited values. The traveling state determining unit 105 can appropriately change these values. In the following description, the slow travel is described as an example of one embodiment of traveling of the vehicle, but the present invention is not particularly limited. Traveling state determining unit 105, even when the front vehicle is traveling other than the speed called slow travel, is allowed to determine that the traveling state of the front vehicle is traveling.

The prediction unit 107 of the present embodiment predicts whether the front vehicle to accelerate at a predetermined acceleration or higher when the traveling state determining unit 105 determines the front vehicle, the rear vehicle, and the target vehicle to be slow travel, using a method described below.

For example, the prediction unit 107, when the front vehicle, the rear vehicle, and the target vehicle is determined to be slow travel, predicts whether the front vehicle to accelerate at a predetermined acceleration or higher in accordance with the behavior of the target vehicle. For example, the prediction unit 107 determines whether the traveling distance of the target vehicle per unit time is equal to or greater than a predetermined distance and predicts whether the front vehicle accelerates at a predetermined acceleration or higher in response to the determination result. When the traveling distance of the target vehicle is measured to be a predetermined distance or more, the prediction unit 107 predicts that the front vehicle accelerates at a predetermined acceleration or higher. On the other hand, when the traveling distance of the target vehicle is measured to be less than a predetermined distance, the prediction unit 107 predicts that the front vehicle maintains the slow travel without accelerating.

Further, the prediction unit 107 is allowed to predict whether the front vehicle accelerates at a predetermined acceleration or higher similarly to the method of predicting the start of the front vehicle, in accordance with the change in the situation of the adjacent lane. The above description is incorporated in the description of the method corresponding to the change in the situation of the adjacent lane.

Further, the prediction unit 107 may determine whether the current situation corresponds to a situation in which the acceleration of the front vehicle is unpredictable. If the current situation is determined to fall under unpredictable situations, the prediction unit 107 may predict that the front vehicle maintains the slow travel without acceleration at a predetermined acceleration or higher. Incidentally, since the situation in which the acceleration of the front vehicle is unpredictable is the same as the situation in which the start of the front vehicle is unpredictable as described above, the aforementioned explanation will be incorporated.

The travel control unit 108 sets a standby position of the subject vehicle when predicting whether the front vehicle accelerates at a predetermined acceleration or higher on the subject lane. The above description will be referred to for the standby position. In the present embodiment, the standby position is represented by a position relative to the front vehicle, rear vehicle, or entry position.

The travel control unit 108 moves the subject vehicle to the standby position when the standby position of the subject vehicle is set. The travel control unit 108 sets the vehicle speed of the subject vehicle in the standby position so that the relative speed of the subject vehicle with respect to the speed of the rear vehicle is zero km/h when another vehicle located in the adjacent lane is slow travel. This allows, if the rear vehicle is slow travel, the prediction unit 107 to predict whether the front vehicle is accelerated in a state of maintaining the positional relationship between the rear vehicle and the standby position.

Further, the travel control unit 108 generates a control signal for turning on a direction indicator provided on the adjacent lane side when an acceleration equal to or higher than a predetermined acceleration by the front vehicle is predicted and when the rear vehicle is determined to be slow travel by the traveling state determining unit 105 at a predicted time point. Further, the travel control unit 108 generates a target trajectory at the time of lane change.

Figure 5A:
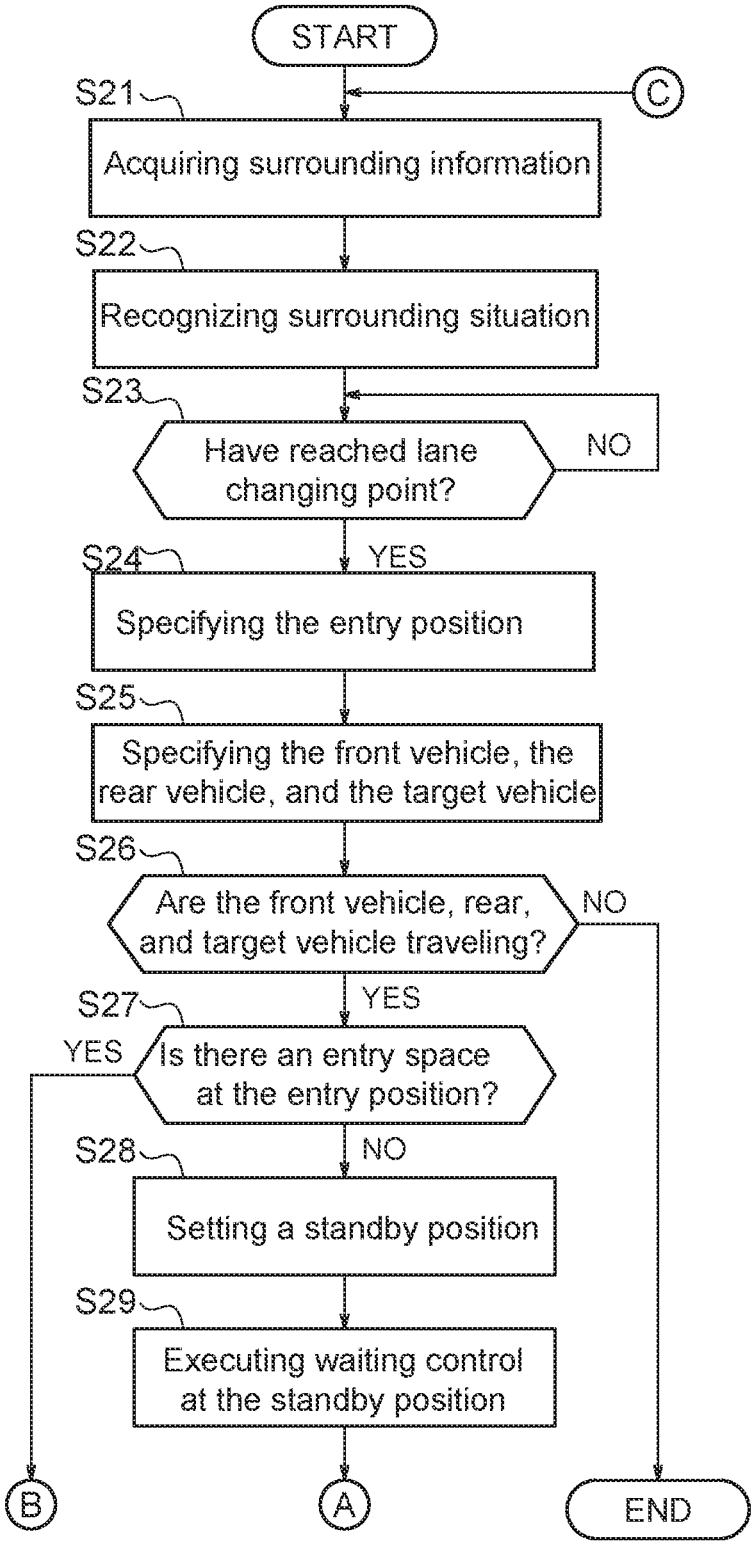
FIG. 5A is a flowchart of a control process executed by the vehicle control device according to the second embodiment of the present invention.
Figure 5B:
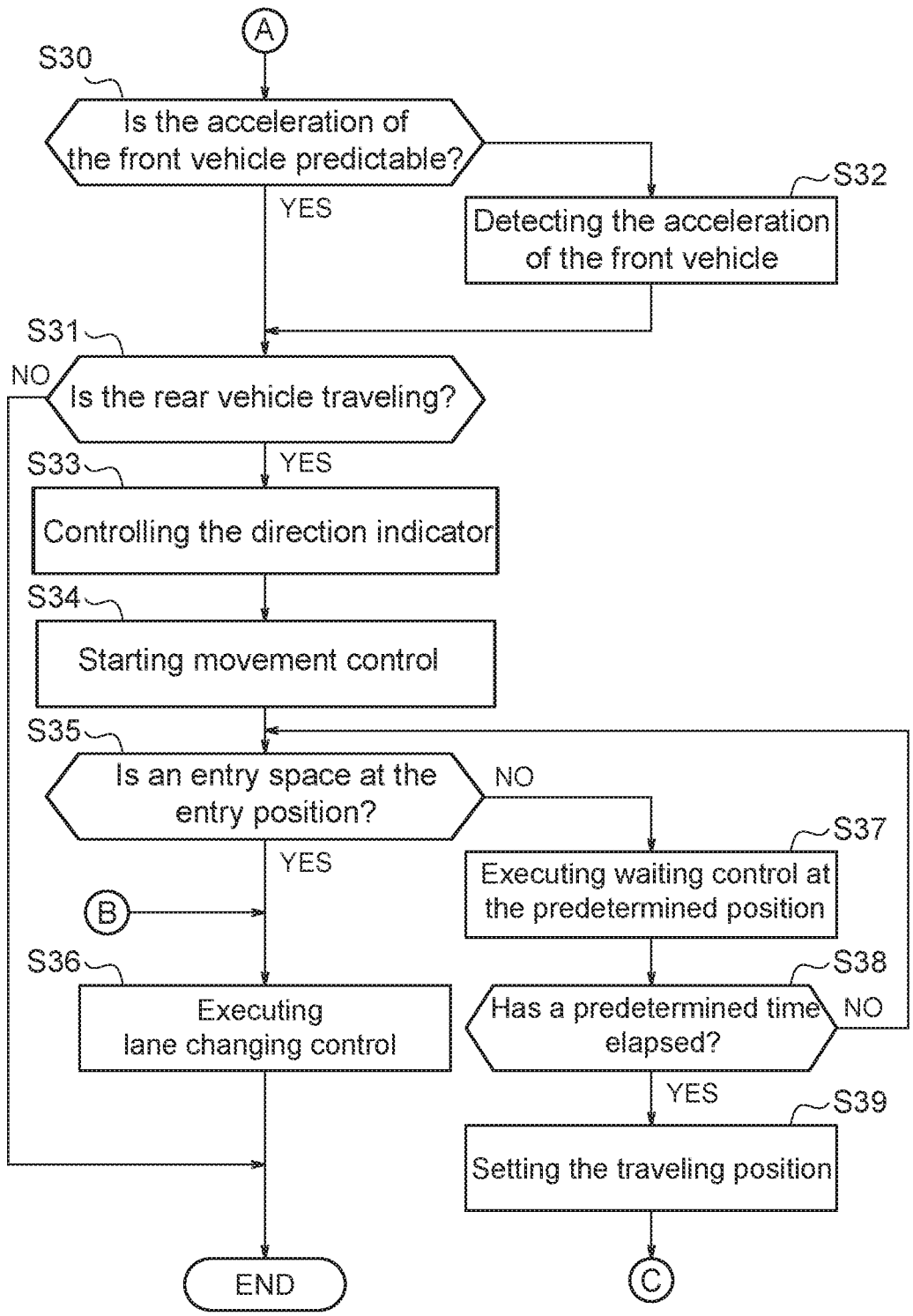
FIG. 5B is a flowchart of a control process executed by a vehicle control device according to a second embodiment.

Next, the vehicle control process according to the present embodiment will be described with reference to FIGS. 5A and 5B. The FIGS. 5A and 5B are flowcharts of lane change processes performed by the vehicle controller 100. Further, with reference to FIGS. 6 and 7, the traveling of the subject vehicle by the vehicle controller 100 will be described. Incidentally, the above description will be referred to for the same portions as those of the vehicle control processing according to the first embodiment.

Steps S21 to S25 correspond to steps S1 to S5 shown in the FIG. 2A. Thus, the description of these steps will be referred to above.

In step S26, the vehicle controller 100 determines the traveling state of the front vehicle, the rear vehicle, and the target vehicle. Specifically, the vehicle controller 100 determines whether all these vehicles are traveling. For example, the vehicle controller 100 determines the traveling state of each vehicle from the detection result detected by the surrounding environment sensor group 10. When all the vehicles are determined to be traveling, the process proceeds to step S27. On the other hand, if at least one of the vehicles is determined to be stopped, the vehicle controller 100 terminates the vehicle change process.

FIG. 6A is an example of a scene in which the subject vehicle V changes lanes from the lane $L_1$ to the lane $L_2$ on a road with two lanes on one side (lane $L_1$, lane $L_2$). FIG. 6A is a diagram corresponding to FIG. 3A. The scene shown in FIG. 6A is different in that each vehicle is traveling compared to the scene shown in FIG. 3A. In other respects, the description in FIG. 3A will be referred to. Incidentally, the scene shown in FIG. 6A is an exemplary scene after the processes of steps S21 to S26 shown in the FIG. 5A are executed. The center line $C_1$ indicates the center line of the lane $L_1$ along the traveling direction of the subject vehicle V, and the center line $C_2$ indicates the center line of the lane $L_2$ along the traveling direction of the subject vehicle V.

In the scene shown in FIG. 6A, the subject vehicle controller 100 determines that the vehicle has reached the lane change point (not shown) (determined as YES in step S23), and specifies the position between another vehicle $X_2$ and another vehicle $X_3$ as the entry position (step S24). Further, the vehicle controller 100, specifies the vehicle $X_2$ positioned in front of the entry position as the front vehicle, the vehicle $X_3$ positioned behind the entry position rear vehicle as the rear vehicle, another vehicle $X_1$ positioned in front of the vehicle $X_2$ respectively specified as the target vehicle (step S25). The vehicle controller 100 determines that the vehicle $X_1$ to the vehicle $X_3$ are traveling in accordance with the surrounding information of the subject vehicle (YES is determined in step S26). The parentheses indicate the corresponding processes in the flowchart shown in the FIG. 5A.

Returning to the FIG. 5A, a flowchart of the lane change process will be described. Step S27 corresponds to step S7 shown in the FIG. 2A. Thus, the description of step S27 is referred to above.

If no entry space is determined to be present at the entry position in step S27, the process proceeds to step S28. In step S28, the subject vehicle controller 100 sets a standby position for waiting the subject vehicle before changing the lane. For example, the vehicle controller 100 sets the standby position on the adjacent lane side with respect to the center line of the subject lane along the traveling direction of the subject vehicle. The standby position is represented, for example, in a position relative to the rear vehicle. In FIG. 6A, the standby position is set to the lane $L_2$ side with respect to the center line $C_1$ of the lane $L_1$.

In step S29, the subject vehicle controller 100 executes a control for waiting the subject vehicle at the standby position set in step S28. For example, the vehicle controller 100 sets the vehicle speed and the steering angle to the standby position, the vehicle speed at the standby position (the relative speed of the subject vehicle to the speed of the rear vehicle is zero km/h), the angle at which the front end of the subject vehicle faces in the standby position, and the like. Then, the vehicle controller 100 outputs a control signal including the contents set to the actuator controller 60.

FIG. 6B shows a scene in which a predetermined period of time has elapsed from the scene shown in FIG. 6A, and is an exemplary scene after the treatments of steps S27 to S29 shown in FIG. 5A have been executed. FIG. 6B corresponds to FIG. 3A described in the first embodiment.

In the scene shown in FIG. 6B, since the distance (l1) between the vehicle $X_2$ and the vehicle $X_3$ is less than the predetermined distance, the vehicle controller 100 determines no entrance space to be present at the entrance position (determining NO in S27). Further, the vehicle controller 100, sets the standby position of the subject vehicle V for performing the prediction process on the subject lane (step S28) and waits the subject vehicle V in the standby position (step S29). Then, the vehicle controller 100 predicts whether the front vehicle (the vehicle $X_2$) accelerates at a predetermined acceleration or more while the vehicle V is in the standby position. The parentheses indicate the corresponding processes in the flowchart shown in the FIG. 5A.

The target trajectory R and dashed line D' shown in FIG. 6B corresponds to the target trajectory R and dashed line D shown in FIG. 3B. Thus, the above description will be referred to for these descriptions.

Returning to the FIG. 5B, a flowchart of the lane change process will be described. In step S30, the vehicle controller 100 determines whether the acceleration of the front vehicle is predictable. For example, the vehicle controller 100 determines whether the traveling distance of the target vehicle per unit time is equal to or greater than a predetermined distance, predicts whether the front vehicle starts in response to the determination result. When the accelerating of the front vehicle is predictable, the process proceeds to step S31. On the other hand, when the accelerating of the front vehicle is unpredictable, or when the current situation corresponds to a situation in which the acceleration of the front vehicle is unpredictable, the process proceeds to step S32.

In step S30, when the acceleration of the front vehicle is unpredictable, or when the current situation corresponds to a situation in which the acceleration of the front vehicle is unpredictable, the process proceeds to step S32. In step S32, the vehicle controller 100 detects the acceleration of the front vehicle (acceleration above a predetermined acceleration) in accordance with the surrounding information of the vehicle. Incidentally, the process waits at this step until the acceleration of the front vehicle can be detected.

If the acceleration of the front vehicle is predictable in step S30, the process proceeds to step S31. In step S31, the vehicle controller 100 determines whether the rear vehicle is traveling while maintaining the speed. This step is for determining whether the vehicle determined to be traveling in step S26 is traveling while maintaining the speed. When the rear vehicle is determined to be traveling while maintaining the speed, the process proceeds to step S33. On the other hand, when the rear vehicle is determined to be traveling by changing the speed, the vehicle controller 100 terminates the vehicle change process.

When the rear vehicle is determined to be traveling in step S31, the process proceeds to step S33. The step S33 corresponds to the step S13 shown in the FIG. 2B. Thus, the description of step S33 is referred to above.

FIG. 6C illustrates a scene in which a predetermined period of time has elapsed from the scene illustrated in FIG. 6B, and is an exemplary scene after the process of steps S30 to S33 illustrated in FIG. 5B have been executed. FIG. 6C corresponds to FIG. 3C described in the first embodiment.

In the scene shown in FIG. 6C, the vehicle controller 100 predicts that the vehicle $X_2$ will accelerate at a predetermined acceleration or more (YES in S30) by detecting that the travel distance of the vehicle $X_1$ is at least a predetermined distance. In addition, the vehicle controller 100 determines that the vehicle $X_3$ (rear vehicle) is traveling while maintaining the speed (YES in S31). In operation S33, the vehicle controller 100 turns on the directional indicator provided on the side of the lane $L_2$. The parentheses indicate the corresponding processes in the flowchart shown in the FIG. 5B.

Returning to the FIG. 5B, a flowchart of the lane change process will be described. Steps S34 to S39 correspond to steps S14 to S19 shown in the FIG. 2B. Thus, the description of these steps will be referred to above.

FIG. 7A illustrates a scene in which a predetermined period of time has elapsed from the scene illustrated in FIG. 6C, and is an exemplary scene after the process illustrated in FIG. 5B has been executed. FIG. 7A corresponds to FIG. 4A described in the first embodiment.

In the scene of FIG. 7A, the vehicle controller 100 generates the target trajectory R' for changing the lane and moves the vehicle V toward the entry position (step S34). Further, the vehicle controller 100 determines that there is no entry space in the entry position (No determination in step S35) and waits the subject vehicle V at a predetermined position (step S37). The parentheses indicate the corresponding processes in the flowchart shown in the FIG. 5B. The dotted line E' corresponds to the dotted line E shown in FIG. 4A. The explanation of the dotted line E' is to be used in conjunction with the explanation given above.

FIG. 7B illustrates a scene in which a predetermined period of time has elapsed from the scene illustrated in FIG. 7A, and is an exemplary scene after the process illustrated in FIG. 5B has been executed. FIG. 7B corresponds to FIG. 4B described in the first embodiment. In the scene of FIG. 7B, the vehicle controller 100 determines that there is no entry space in the entry position (determined as YES in step S35). The parentheses indicate the corresponding processes in the flowchart shown in the FIG. 5B.

FIG. 7C illustrates a scene in which a predetermined period of time has elapsed from the scene illustrated in FIG. 7B, and is an exemplary scene after the process illustrated in FIG. 5B has been executed. FIG. 7C corresponds to FIG. 4C described in the first embodiment. In the scene of FIG. 7C, the vehicle controller 100 causes the subject vehicle V to enter a position between the vehicle $X_2$ and the vehicle $X_3$ by traveling the subject vehicle V along the target trajectory R' (S36). The vehicle V changes the lane from the lane $L_1$ to the lane $L_2$. The parentheses indicate the corresponding processes in the flowchart shown in the FIG. 5B.

As described above, in the present embodiment, in the subject vehicle control method executed by the vehicle controller 100 according to the present embodiment, when the front vehicle and the rear vehicle are determined to be traveling and that there is no entry space at the entry position, the vehicle controller 100 predicts whether the front vehicle will accelerate at a predetermined acceleration or more, and when acceleration of the front vehicle is predicted, the vehicle controller 100 moves the subject vehicle toward the entry position. This allows the subject vehicle to start moving toward the entry position before the rear vehicle accelerates, i.e., while the rear vehicle is traveling while maintaining speed. When the front vehicle actually accelerates at a predetermined acceleration or higher, the subject vehicle is moving toward the entry position or waiting at a predetermined position. This urges driver of the rear vehicle to maintain or decelerate the speed of the rear vehicle and allows the subject vehicle easily to enter. As a result, for example, if the traffic jam prevents the subject vehicle from entering the adjacent lane, the lane change at an appropriate timing are enabled and missing the chance of the lane change can be reduced.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the first embodiment described above, the lane change processing is executed when the front vehicle and the target vehicle is stopped, in the second embodiment described above, the lane change processing is executed when the front vehicle and the target vehicle is traveling. However, these lane change processing may be combined. That is, when the determining unit 105 determines each vehicle to be stopped, the lane changing process in the first embodiment may be executed. On the other hand, when each vehicle is determined to be traveling, the lane changing process in the second embodiment may be executed. This allows to carry out lane changes at appropriate timing in situations where enter to adjacent lanes is difficult due to no entry space, regardless of the traveling state of each vehicle.

For example, in this specification, the vehicle control apparatus according to the present invention will be described by taking the vehicle controller 100 as an example, but the present invention is not limited thereto. In addition, in this specification, the first lane according to the present invention will be described as an example of the subject lane, but the present invention is not limited thereto. In addition, in this specification, a second lane according to the present invention will be described as an example of an adjacent lane, but the present invention is not limited thereto. In addition, in this specification, the acquisition unit according to the present invention will be described using the information acquiring unit 102 as an example, but the present invention is not limited thereto. In addition, in this specification, the first specific unit and the second specific unit according to the present invention will be described by way of example with respect to the specifying unit 104, but the present invention is not limited thereto. In this specification, the first determining unit according to the present invention will be described by taking the traveling state determining unit 105 as an example, but the present invention is not limited to this. In addition, in this specification, the second determining unit according to the present invention will be described using the space presence determining unit 106 as an example, but the present invention is not limited thereto. In this specification, the travel control unit according to the present invention will be described by taking the travel control unit 108 as an example, but the present invention is not limited to this.

EXPLANATIONS OF LETTERS OR NUMERALS

10 . . . Surrounding environment sensor group
11 . . . Radar
12 . . . Imaging device
20 . . . Vehicle sensor group
21 . . . Vehicle speed sensor
22 . . . Accelerometer
23 . . . Gyro sensor
24 . . . Steering angle sensor
25 . . . Accelerator sensor
26 . . . Brake sensor
30 . . . Navigation system
31 . . . GPS
32 . . . Communicator
33 . . . Navi controller
40 . . . Map database
50 . . . HMI
60 . . . Actuator controller
70 . . . Vehicle actuator group
71 . . . Steering actuator
72 . . . Accelerator actuator
73 . . . Brake control actuator
80 . . . Direction indicator
100 . . . Vehicle controller
101 . . . Controller
102 . . . Acquiring unit
103 . . . Situation recognizing unit
104 . . . Specifying unit
105 . . . Traveling state determining unit
106 . . . Space presence determining unit
107 . . . Prediction unit
108 . . . Travel control unit
200 . . . Vehicle system

The invention claimed is:
1. A vehicle control method executed by a processor capable of executing a lane change of a subject vehicle comprising:
acquiring surrounding information of the subject vehicle by a sensor provided in the subject vehicle;
specifying an entry position located on a second lane adjacent to a first lane on which the subject vehicle travels in accordance with the surrounding information in front of the subject vehicle, the entry position indicating a position which the subject vehicle enters;
specifying a front vehicle located in front of the entry position and a rear vehicle located behind the entry position among other vehicles;
determining a travel state of the front vehicle and the rear vehicle respectively;
determining whether a space for the subject vehicle to enter is present at the entry position;
predicting whether the front vehicle starts to travel when determining that the front vehicle and the rear vehicle are stopped and no space present at the entry position;

starting to move the subject vehicle to the entry position when the front vehicle is predicted to start traveling; and not starting to move the subject vehicle to the entry position when a start of the front vehicle is unpredictable, or when a current situation corresponds to a situation in which the start of the front vehicle is unpredictable.

2. The vehicle control method according to claim 1, further comprising:

specifying a target vehicle, being another vehicle located in front of the front vehicle;

determining whether a travel distance of the target vehicle per unit time is equal to or greater than a predetermined distance, and;

predicting the front vehicle to start when the travel distance of the target vehicle is determined to be equal to or greater than the predetermined distance.

3. The vehicle control method according to claim 2, further comprising:

predicting the front vehicle not to start when the travel distance of the target vehicle is less than the predetermined distance, and;

keeping the subject vehicle waiting when the front vehicle is predicted not to start.

4. The vehicle control method according to claim 2, further comprising:

predicting the front vehicle to start when the travel distance of the target vehicle is equal to or greater than the predetermined distance, and;

setting the travel distance of the subject vehicle toward the entry position in accordance with the travel distance of the target vehicle.

5. The vehicle control method according to claim 1, further comprising:

specifying a target vehicle, being another vehicle located in front of the front vehicle, and;

predicting the front vehicle to start when a brake lamp of the target vehicle is detected to be off.

6. The vehicle control method according to claim 1, further comprising:

predicting the front vehicle to start when a brake lamp of the front vehicle is detected to be off.

7. The vehicle control method according to claim 1, further comprising:

acquiring information on a traffic signal determining a traffic flow of the second lane from a device capable of communicating with an outside of the subject vehicle, and;

predicting the front vehicle to start when a signal display of the traffic signal changes from red to blue.

8. The vehicle control method according to claim 1, further comprising:

setting a standby position of the subject vehicle on the first lane when no space is determined to be present at the entry position; and predicting whether the front vehicle starts to move while keeping the subject vehicle waiting at the standby position, wherein the standby position satisfies at least one of:

(i) the standby position is on a second lane side with respect to a center line of the first lane along a direction of travel of the subject vehicle;

(ii) the standby position is behind the front vehicle; and (iii) a front end of the subject vehicle located on the standby position is behind a rear end of the front vehicle and the front end of the subject vehicle located on the standby position is front of the front end of the rear vehicle.

9. The vehicle control method according to claim 1, further comprising:

specifying a target vehicle, being another vehicle located in front of the front vehicle;

setting a standby position of the subject vehicle on the first lane when no space is determined to be present at the entry position; and predicting whether the front vehicle starts to move while keeping the subject vehicle waiting at the standby position, wherein the standby position is a position within a detection range of the sensor.

10. The vehicle control method according to claim 1, further comprising:

moving the subject vehicle to a predetermined position when the front vehicle is predicted to start moving, wherein the predetermined position satisfies:

a side end of a second lane side of the subject vehicle located in the predetermined position is on a first lane side with respect to an imaginary boundary line formed by connecting a nearest position to the first lane of a front end of the rear vehicle and the nearest position to the first lane of a rear end of the front vehicle.

11. The vehicle control method according to claim 1, further comprising:

starting to move the subject vehicle toward the entry position after detecting the start of the front vehicle when the current situation falls under the situation in which the start of the front vehicle is unpredictable.

12. The vehicle control method according to claim 11, wherein the situation in which the start of the front vehicle is unpredictable satisfies at least one of:

(i) a road shape of the second lane is curved; and (ii) the front vehicle is a large-sized automobile.

13. The vehicle control method according to claim 1, further comprising:

turning on a direction indicator on a second lane side when the start of the front vehicle is predicted.

14. The vehicle control method according to claim 1, further comprising:

predicting whether the front vehicle accelerates at a predetermined acceleration or more when the front vehicle and the rear vehicle are determined to be traveling and no space for the subject vehicle to enter is determined; and moving the subject vehicle to the entry position when an acceleration of the subject vehicle is predicted.

15. A vehicle control device capable of changing a lane of a subject vehicle by a control device, comprising:

an acquisition unit acquiring surrounding information of the subject vehicle by a sensor provided in the subject vehicle;

a first specification unit specifying an entry position located on a second lane adjacent to a first lane in which the subject vehicle travels in accordance with the surrounding information of the subject vehicle, the entry position indicating a position which the subject vehicle enters;

a second specification unit specifying a front vehicle located in front of the entry position and a rear vehicle located behind the entry position;

a first determining unit determining a travel state of each of the front vehicle and the rear vehicle, a second determining unit determining whether a space for the subject vehicle to enter is present at the entry position;

a predicting unit whether the front vehicle starts to travel when the first determining unit determines that the front vehicle and the rear vehicle are stopped and the second determining unit determines that no space present at the entry position; and a travel control unit starting movement of the subject vehicle toward the entry position when a start of the front vehicle is predicted and not starting to move the subject vehicle to the entry position when the start of the front vehicle is unpredictable, or when a current situation corresponds to a situation in which the start of the front vehicle is unpredictable.

16. The vehicle control method according to claim 1, further comprising:

setting a standby position of the subject vehicle on the first lane when determining that the front vehicle and the rear vehicle are stopped and no space present at the entry position; and predicting whether the front vehicle starts to move while keeping the subject vehicle waiting at the standby position.

\* \* \* \* \*